(12) United States Patent
Narihira

(10) Patent No.: US 11,355,007 B2
(45) Date of Patent: Jun. 7, 2022

(54) ACCUMULATING DRIVING EVALUATION DATA OF ANOTHER CAR FROM A VEHICLE AND EVALUATING DRIVING OF A DRIVER OF EACH VEHICLE

(71) Applicant: SONY CORPORATION, Tokyo (JP)

(72) Inventor: Takuya Narihira, Tokyo (JP)

(73) Assignee: SONY CORPORATION, Tokyo (JP)

(*) Notice: Subject to any disclaimer, the term of this patent is extended or adjusted under 35 U.S.C. 154(b) by 87 days.

(21) Appl. No.: 16/639,182

(22) PCT Filed: Jul. 31, 2018

(86) PCT No.: PCT/JP2018/028626
§ 371 (c)(1),
(2) Date: Feb. 14, 2020

(87) PCT Pub. No.: WO2019/039212
PCT Pub. Date: Feb. 28, 2019

(65) Prior Publication Data
US 2020/0234571 A1 Jul. 23, 2020

(30) Foreign Application Priority Data
Aug. 23, 2017 (JP) ................................ 2017-160158

(51) Int. Cl.
*G08G 1/01* (2006.01)
*G08G 1/017* (2006.01)

(52) U.S. Cl.
CPC ......... *G08G 1/0112* (2013.01); *G08G 1/0133* (2013.01); *G08G 1/0141* (2013.01); *G08G 1/0175* (2013.01)

(58) Field of Classification Search
CPC .. G08G 1/0112; G08G 1/0133; G08G 1/0141; G08G 1/0175; G08G 1/00;
(Continued)

(56) References Cited

U.S. PATENT DOCUMENTS

| 10,032,318 B1* | 7/2018 | Ferguson | G07C 5/0825 |
| 2005/0137757 A1* | 6/2005 | Phelan | G07C 5/02 701/1 |
| 2017/0305434 A1* | 10/2017 | Ratnasingam | G06N 20/00 |

FOREIGN PATENT DOCUMENTS

JP 2016-224477 A 12/2016

OTHER PUBLICATIONS

International Search Report and Written Opinion of PCT Application No. PCT/JP2018/028626, dated Sep. 11, 2018, 06 pages of ISRWO.

* cited by examiner

*Primary Examiner* — Kerri L McNally
(74) *Attorney, Agent, or Firm* — Chip Law Group

(57) ABSTRACT

A configuration is realized that enables to acquire and accumulate driving evaluation data of another car from a vehicle and evaluate driving of a driver of each vehicle. Vehicle information, driver information, and location information are transmitted from a vehicle-side information processing apparatus to an information management apparatus, and in addition, evaluation information regarding driving of the other vehicle is transmitted to the information management apparatus. The information management apparatus receives the vehicle information, the driver information, and the location information from the vehicle and stores the received information in a database and receives evaluation information and time information, driver information, and the like at the time of evaluation. By matching processing on the data stored in the database and the data received together with the evaluation information, an evaluation target vehicle and a driver are specified, stored in an evaluation information database, and analysis processing based on the stored data is executed, and the analysis result is provided to the driver and the like.

19 Claims, 19 Drawing Sheets

(58) Field of Classification Search
CPC ........ G08G 1/09; G06Q 40/08; G07C 5/0841; G07C 5/008
See application file for complete search history.

FIG. 3

| | VEHICLE ID | VEHICLE TYPE | REGISTERED DRIVER ID | VEHICLE IMAGE | | | |
|---|---|---|---|---|---|---|---|
| (1) | 0100123 | CORONA | 020553 030448 | | | | |
| (2) | 0304561 | MARCI | 060002 | | | | |
| ... | ... | ... | ... | ... | | | |

VEHICLE INFORMATION DATABASE

FIG. 4

DRIVER INFORMATION DATABASE

| | DRIVER ID | VEHICLE ID | DRIVING TIME INFORMATION |
|---|---|---|---|
| (1) | 020553 | 0100123 | 20170111, 14:28:05 TO 20170111, 15:18:10 |
| (2) | 060002 | 0304561 | 20170112, 08:12:12 TO |
| ⋮ | ⋮ | ⋮ | ⋮ |

FIG. 5

VEHICLE LOCATION INFORMATION DATABASE

| VEHICLE ID | TIME — LOCATION ASSOCIATED INFORMATION |
|---|---|
| (1) 0100123 | 20170111, 14:28:00/35.458 139.552<br>20170111, 14:30:00/35.721 140.221<br>⋮ |
| (2) 020456 | 20170111, 14:28:00/37.222 141.389<br>20170111, 14:30:00/37.235 141.399<br>⋮ |
| ⋮ | ⋮ |

FIG. 7

EVENT INFORMATION DATABASE

| | EVENT ID | DATE AND TIME INFORMATION | EVENT INFORMATION OUTPUT VEHICLE ID | EVENT INFORMATION OUTPUT VEHICLE DRIVER ID | EVALUATION VALUE (+50 TO −50) | EVALUATOR ID (DRIVER ID OR SENSOR ID) | EVALUATION TARGET VEHICLE INFORMATION |
|---|---|---|---|---|---|---|---|
| (1) | 00123 | 20170121, 12:31:12 | 0100123 | 020553 | −25 | 584665 | |
| (2) | 00124 | 20170121, 12:45:15 | 0304561 | 060002 | +30 | 036445 | |
| ... | ... | ... | ... | ... | ... | ... | ... |

FIG. 9

EVALUATION INFORMATION DATABASE

| | DATE AND TIME INFORMATION | LOCATION INFORMATION | EVALUATION TARGET VEHICLE ID | EVALUATION TARGET DRIVER ID | EVALUATION VALUE (+50 TO −50) | EVALUATOR ID |
|---|---|---|---|---|---|---|
| (1) | 20170121,12:31:12 | 35.458 139.552 | 0100123 | 020553 | −25 | 082565 |
| (2) | 20170121,12:45:15 | 33.336 135.488 | 0304561 | 060002 | +30 | 048257 |
| ... | ... | ... | ... | ... | ... | ... |

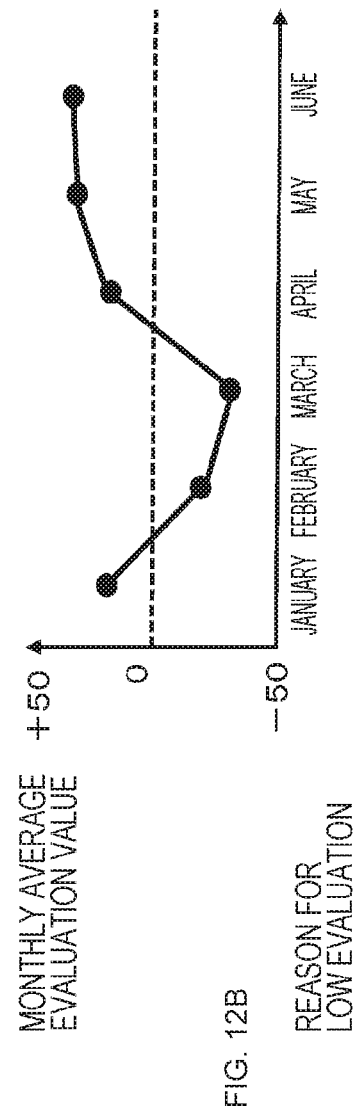
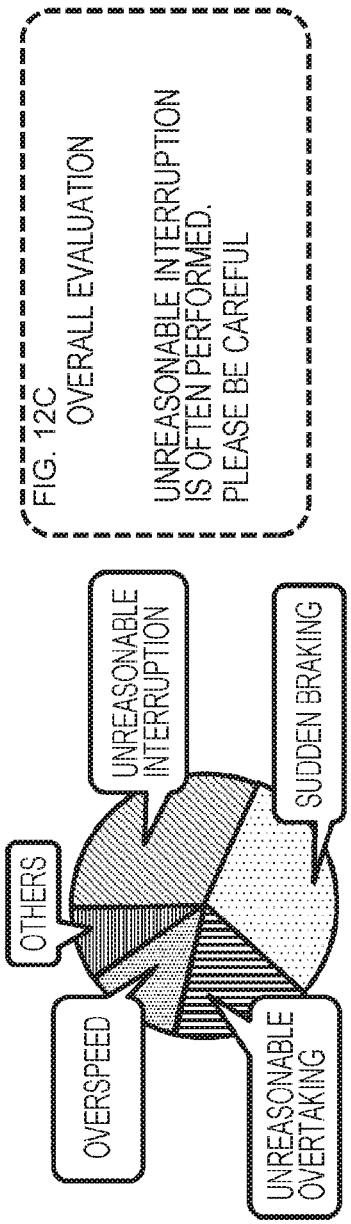
FIG. 12A EVALUATION DATA SUMMARY (EVALUATION FROM OTHERS)
FIG. 12B REASON FOR LOW EVALUATION
FIG. 12C OVERALL EVALUATION
UNREASONABLE INTERRUPTION IS OFTEN PERFORMED. PLEASE BE CAREFUL

EVALUATION DATA SUMMARY (EVALUATION TO OTHERS)

EVALUATION VALUE STATISTICS (201601 TO 201606)

REQUEST FOR
EVALUATION VALUE SETTING

YOU TEND TO MAKE
NEGATIVE EVALUATIONS.
PLEASE ACTIVELY INPUT
POSITIVE EVALUATIONS.

FIG. 13B MONTHLY AVERAGE EVALUATION VALUE

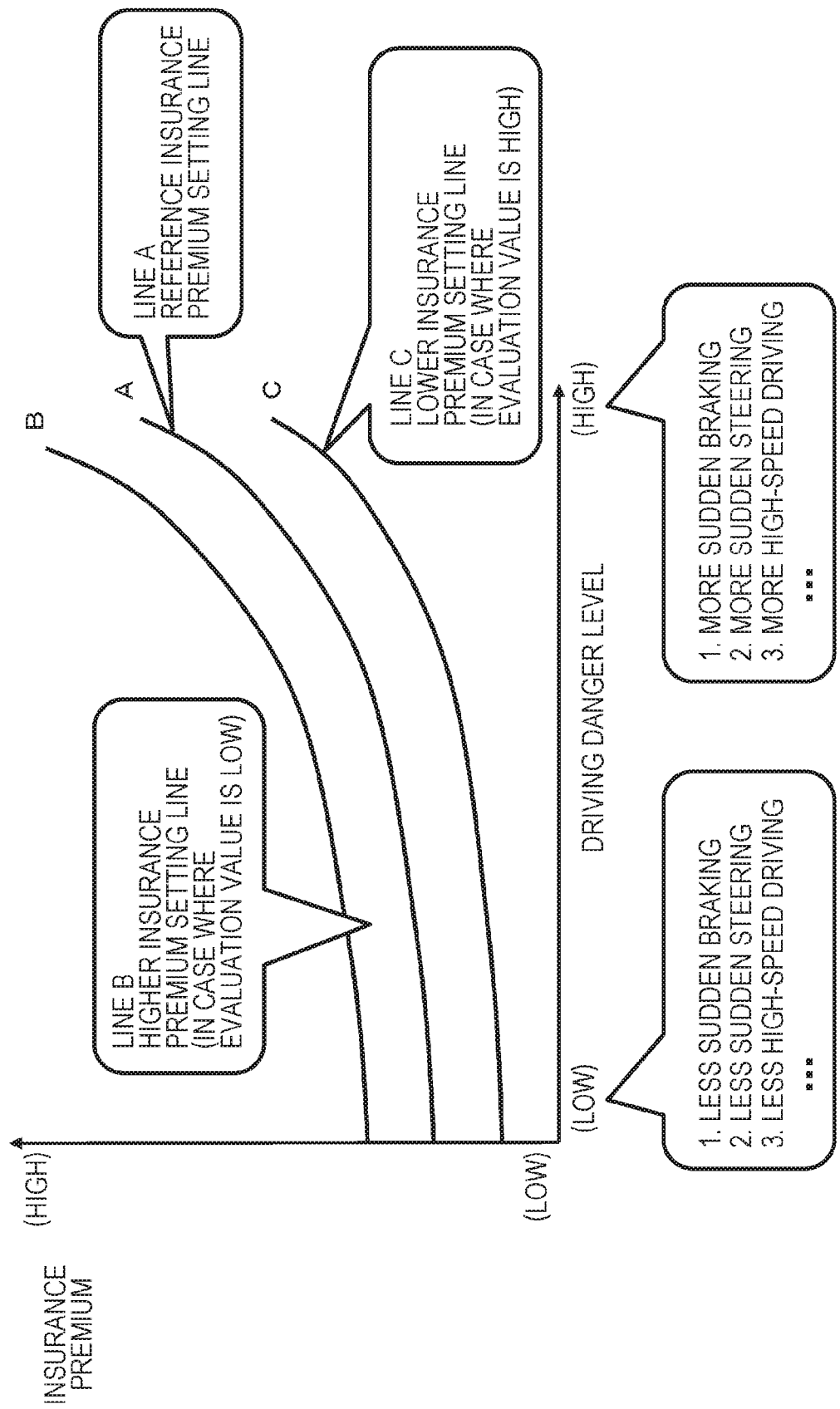

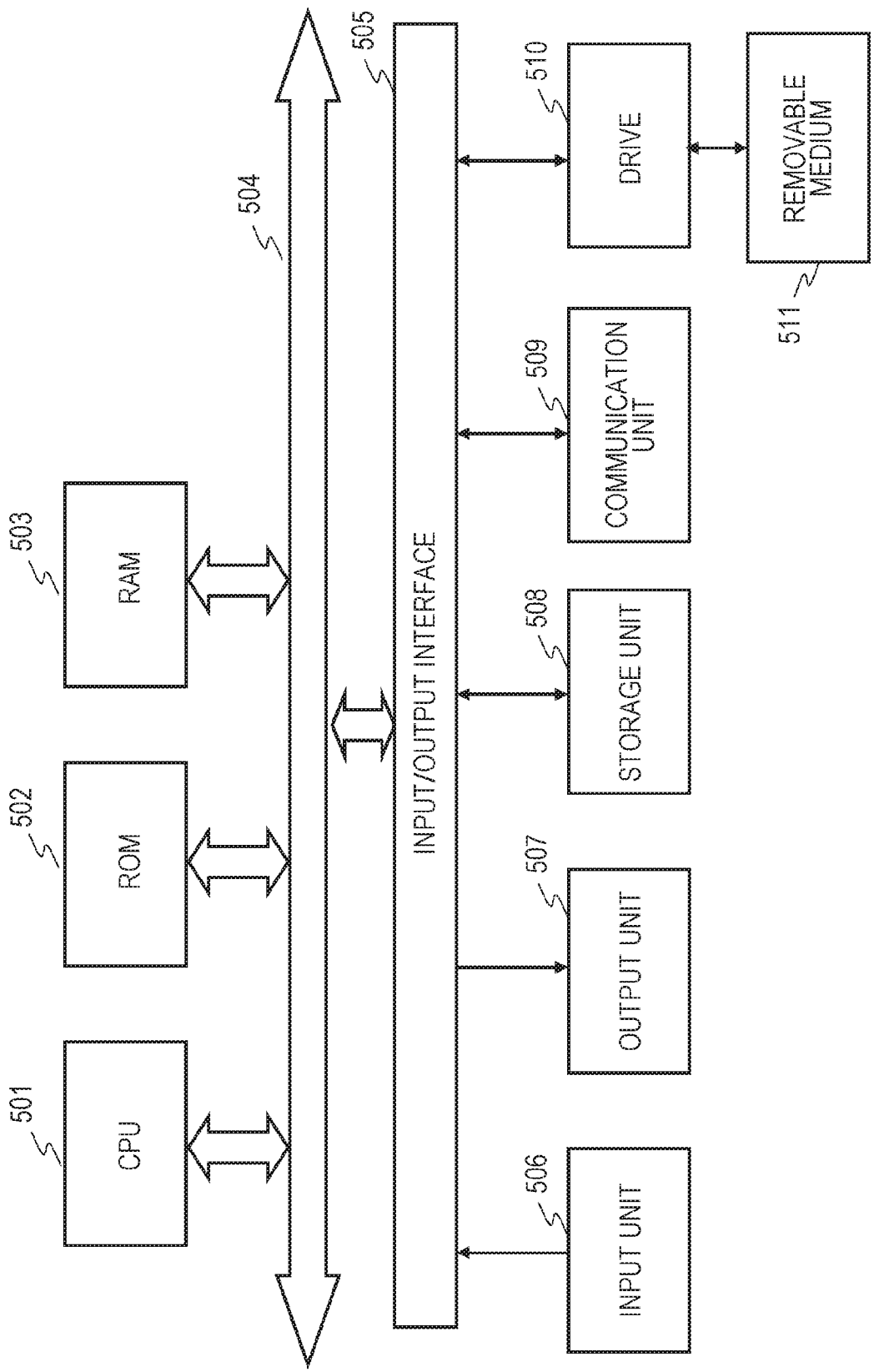

ACCUMULATING DRIVING EVALUATION DATA OF ANOTHER CAR FROM A VEHICLE AND EVALUATING DRIVING OF A DRIVER OF EACH VEHICLE

CROSS REFERENCE TO RELATED APPLICATIONS

This application is a U.S. National Phase of International Patent Application No. PCT/JP2018/028626 filed on Jul. 31, 2018, which claims priority benefit of Japanese Patent Application No. JP 2017-160158 filed in the Japan Patent Office on Aug. 23, 2017. Each of the above-referenced applications is hereby incorporated herein by reference in its entirety.

TECHNICAL FIELD

The present disclosure relates to an information processing apparatus, an information processing system, an information processing method, and a program. More specifically, present disclosure relates to an information processing apparatus, an information processing system, an information processing method, and a program that execute evaluation processing regarding driving of a driver of an automobile.

BACKGROUND ART

Driving techniques for automobiles vary according to a driver, and there are many drivers whose driving is dangerous while many drivers drive automobiles as keeping safety driving in mind.

Furthermore, in recent years, with an increase in the number of elderly drivers, dangerous driving due to deterioration in the driving technique tends to increase.

However, for example, it is not possible to know whether or not a car around the own car is an automobile driven by a driver who performs dangerous driving.

If such information can be obtained in advance, the driver can prevent an accident in advance, for example, by increasing an inter-vehicle distance from surrounding cars.

Furthermore, in recent years, as an insurance related to an automobile that is a so-called automobile insurance, a telematics insurance has been widely used that acquires and analyzes driver's driving information such as a travel distance of a vehicle or driving characteristics, determines whether or not the driver performs safely driving, and calculates an insurance premium on the basis of the determination result.

There are two types of telematics insurance including the pay as you drive (PAYD) type of which an insurance premium is linked to only a travel distance and a pay how you drive (PHYD) type of which an insurance premium is calculated in consideration of the driving characteristics of the driver, for example, driving characteristics such a frequency of sudden braking, sudden start, and the like.

In order to calculate the insurance premium on the basis of the driving characteristics of the driver, it is necessary to acquire driving characteristics data of the driver, and information that is collected on the basis of various sensors provided in the vehicle is used as basic data for insurance premium calculation.

Note that, for example, Patent Document 1 (Japanese Patent Application Laid-Open No. 2016-147600) discloses an insurance premium calculation processing configuration based on the collection of such driving information.

For the pay as you drive (PHYD) type telematics insurance, an insurance premium is calculated on the basis of the driving characteristics of the driver.

Specifically, for example, in a case where sudden braking, sudden start, sudden steering are frequently used, it is determined that the number of times of dangerous driving is large, and the insurance premium is set to be high.

However, for example, sudden braking is often used to avoid danger, and there are many opinions that there is a problem in that the insurance premium is set to be high due to the number of times of sudden braking.

As a method of preventing such a problem, it is considered that driving evaluation by others is effective.

CITATION LIST

Patent Document

Patent Document 1: Japanese Patent Application Laid-Open No. 2016-147600

SUMMARY OF THE INVENTION

Problems to be Solved by the Invention

The present disclosure has been made, for example, in consideration of the above problems, and an object of the present disclosure is to provide an information processing apparatus, an information processing system, an information processing method, and a program that make it possible to evaluate driving of an automobile driver by a driver of another automobile around the automobile, accumulate evaluation data, and perform data analysis based on the accumulated data, information providing processing and insurance premium calculation based on the analysis result, and the like.

Solutions to Problems

A first aspect of the present disclosure is
an information processing apparatus that includes
an evaluation information input unit that inputs evaluation information regarding driving of another vehicle, and
a communication unit that transmits the evaluation information input by the evaluation information input unit to an information management apparatus.

Moreover, a second aspect of the present disclosure is
an information processing apparatus that includes
a communication unit that receives evaluation information regarding driving of another car from a vehicle,
an evaluation information database that stores the evaluation information, and
a totaling processing unit that executes analysis processing based on data stored in the evaluation information database.

Moreover, a third aspect of the present disclosure is
an information processing system that includes
a vehicle-side information processing apparatus, and
an information management apparatus, in which
the vehicle-side information processing apparatus includes
an evaluation information input unit that inputs evaluation information regarding driving of another vehicle, and
a communication unit that transmits the evaluation information input to the evaluation information input unit to the information management apparatus, and
the information management apparatus includes
a communication unit that receives the evaluation information from the vehicle-side information processing apparatus, an evaluation information database that stores the evaluation information, and a totaling processing unit that executes analysis processing based on data stored in the evaluation information database.

Moreover, a fourth aspect of the present disclosure is an information processing method executed by an information processing apparatus, the method including input detection processing of detecting input processing of evaluation information regarding driving of another vehicle to an evaluation information input unit, and data transmission processing of transmitting the evaluation information input to the evaluation information input unit to an information management apparatus via a communication unit.

Moreover, a fifth aspect of the present disclosure is an information processing method executed by an information processing apparatus, the method including a communication step of receiving evaluation information regarding driving of another car from a vehicle via a communication unit, a step of storing the evaluation information in an evaluation information database by a data processing unit, and a totaling step of executing analysis processing based on data stored in the evaluation information database by a totaling processing unit.

Moreover, a sixth aspect of the present disclosure is a program for causing an information processing apparatus to execute information processing including input detection processing of detecting input processing of evaluation information regarding driving of another vehicle to an evaluation information input unit, and data transmission processing of transmitting the evaluation information input to the evaluation information input unit to an information management apparatus via a communication unit.

Moreover, a seventh aspect of the present disclosure is a program for causing an information processing apparatus to execute information processing including a communication step of receiving evaluation information regarding driving of another car from a vehicle via a communication unit, a step of storing the evaluation information in an evaluation information database by a data processing unit, and a totaling step of executing analysis processing based on data stored in the evaluation information database by a totaling processing unit.

Note that, for example, a program according to the present disclosure can be provided by a storage medium and a communication medium which provide the program in a computer-readable format to an information processing apparatus and a computer system which can execute various program codes. The information processing apparatus and the computer system can realize processing according to the program by providing such programs in a computer-readable format.

Other purpose, characteristics, and advantages of the present disclosure would be obvious by the detailed description based on the embodiments of the present disclosure as described later and the attached drawings. Note that, the system herein is a logical group configuration of a plurality of devices, and the devices of the configuration are not limited to be housed in the same casing.

Effects of the Invention

According to the configuration of one embodiment of the present disclosure, a configuration is realized that can acquire and accumulate driving evaluation data of another car from a vehicle and evaluate driving of a driver of each vehicle.

Specifically, for example, vehicle information, driver information, and location information are transmitted from a vehicle-side information processing apparatus to an information management apparatus, and in addition, evaluation information regarding driving of the other vehicle is transmitted to the information management apparatus. The information management apparatus receives the vehicle information, the driver information, and the location information from the vehicle and stores the received information in a database and receives evaluation information and time information, driver information, and the like at the time of evaluation. By matching processing on the data stored in the database and the data received together with the evaluation information, an evaluation target vehicle and a driver are specified, stored in an evaluation information database, and analysis processing based on the stored data is executed, and the analysis result is provided to the driver and the like.

According to this configuration, a configuration is realized that enables to acquire and accumulate driving evaluation data of another car from a vehicle and evaluate driving of a driver of each vehicle.

Note that the effects described herein are only exemplary and not limited to these. Furthermore, there may be an additional effect.

BRIEF DESCRIPTION OF DRAWINGS

FIG. 3 is a diagram for explaining an example of data stored in a vehicle information database.

FIG. 4 is a diagram for explaining an example of data stored in a driver information database.

FIG. 5 is a diagram for explaining an example of data stored in a vehicle location information database.

FIG. 7 is a diagram for explaining an example of data stored in an event information database.

FIG. 9 is a diagram for explaining an example of data stored in an evaluation information database.

FIGS. 12A, 12B, and 12C are diagrams for explaining an output example of the evaluation information.

FIGS. 13A, 13B, and 13C are diagrams for explaining an output example of the evaluation information.

MODE FOR CARRYING OUT THE INVENTION

Hereinafter, an information processing apparatus, an information processing system, an information processing method, and a program according to the present disclosure will be described in detail with reference to the drawings. Note that the description will be made according to the following items.

1. Outline of Information Processing System

2. Device Configuration and Processing of Vehicle-side Information Processing Apparatus and Information Management Apparatus 3. Information Provision Processing Using Evaluation Information 4. Processing for Notifying Approach of Dangerous Driving Vehicle 5. Exemplary Processing Applied to Insurance Premium Calculation of Telematics Insurance 6. Exemplary Configuration of Information Processing Apparatus 7. Summary of Configuration of Present Disclosure

[1. Outline of Information Processing System]

First, an outline of an information processing system according to the present disclosure will be described with reference to FIG. 1.

Figure 1:
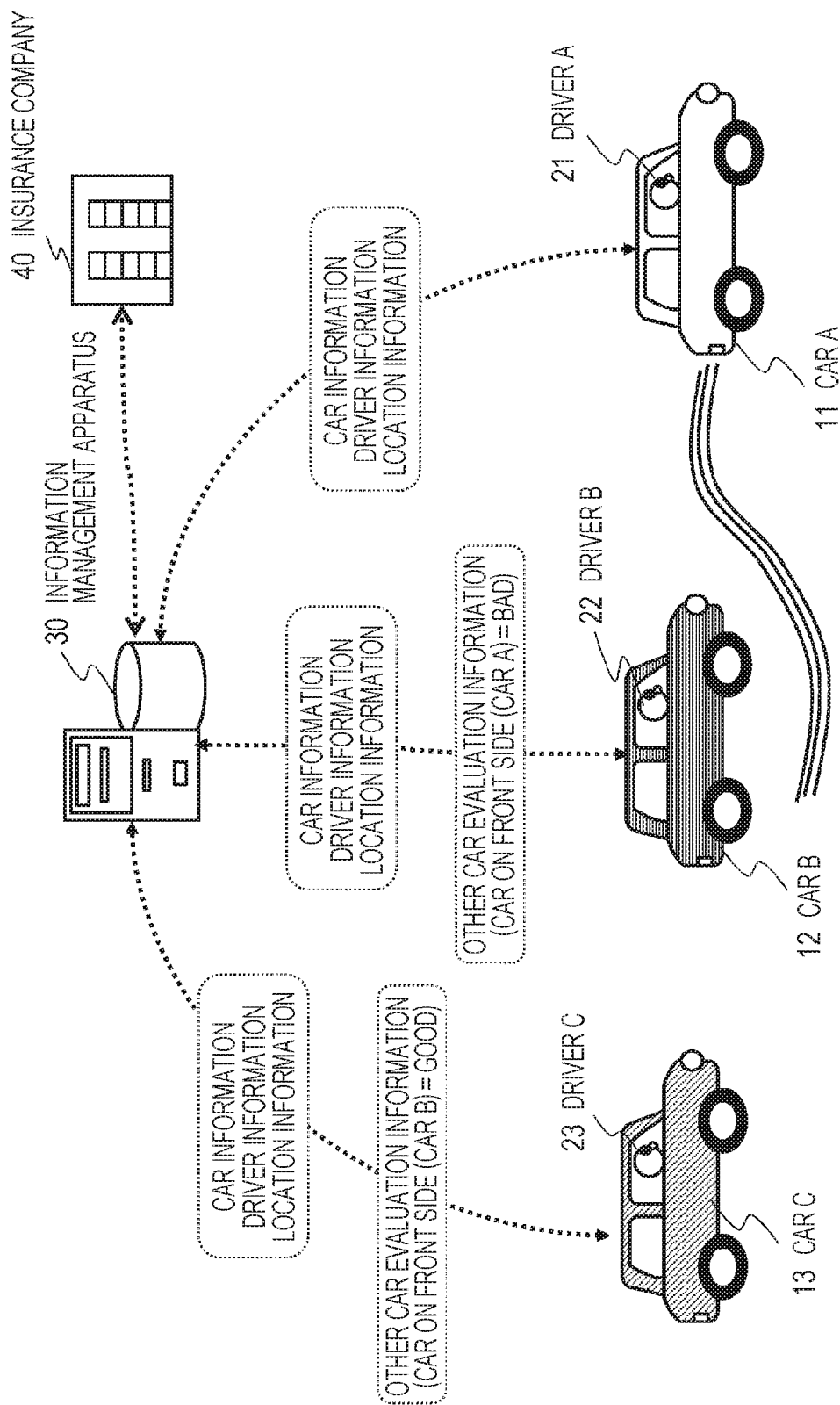
FIG. 1 is a diagram for explaining an exemplary configuration of an information processing system.

FIG. 1 is a diagram illustrating an exemplary configuration of the information processing system according to the present disclosure.

In FIG. 1, a car A11, a car B12, and a car C13 that travel side by side in the front-back direction.

Drivers A21, B22, and C23 respectively drive the cars A to C.

Each of the cars A to C communicates with an information management apparatus 30 and transmits various information below to the information management apparatus 30.

(1) Car Information
(2) Driver Information
(3) Location Information (1) The car information is information including a car ID as car identification information.

(2) The driver information is information including a driver ID as driver identification information.

(3) The location information is location information acquired by a location information acquisition device, for example, a GPS mounted on a car.

Note that the information management apparatus 30 includes a vehicle information database in which the car information is registered.

The vehicle information database stores, for example, the car ID, a vehicle type, a registered driver, all-around image data of the car, and the like in association with each other.

Furthermore, the information management apparatus 30 includes a driver information database in which the driver information is registered.

The driver information database stores, for example, the driver ID, the car ID, driving time information data, and the like in association with each other.

Database configurations will be described later in detail.

A driver or an occupant of each of the cars A to C can confirm and evaluate driving conditions of surrounding cars and transmit driving evaluation information of other cars to the information management apparatus 30.

For example, the driver B22 of the car B12 illustrated in FIG. 1 observes a driving condition of the car A11 that has jumped in front of the car B12 due to sudden overtake and determines that the driving condition is dangerous driving, makes negative evaluation (BAD) on the basis of the determination, and transmits the evaluation information to the information management apparatus 30 as other car evaluation information.

Furthermore, for example, the driver C23 of the car C13 illustrated in FIG. 1 observes the driving condition of the car B12 on the front side, determines that safety driving is performed in compliance with a legal speed, makes positive evaluation (GOOD) on the basis of the determination, and transmits the evaluation information to the information management apparatus 30 as the other car evaluation information.

The information management apparatus 30 accumulates the evaluation information received from each car, analyzes the accumulated data, and provides analysis results to, for example, the driver of each car.

Moreover, the information management apparatus 30 provides the evaluation information and the analysis results to an insurance company 40 and the like as necessary. The insurance company 40 uses the information for calculation of the insurance premium for each driver.

[2. Device Configuration and Processing of Vehicle-Side Information Processing Apparatus and Information Management Apparatus]

Next, device configurations and processing of a vehicle-side information processing apparatus and an information management apparatus will be described below with reference to FIG. 2 and subsequent drawings.

Figure 2:
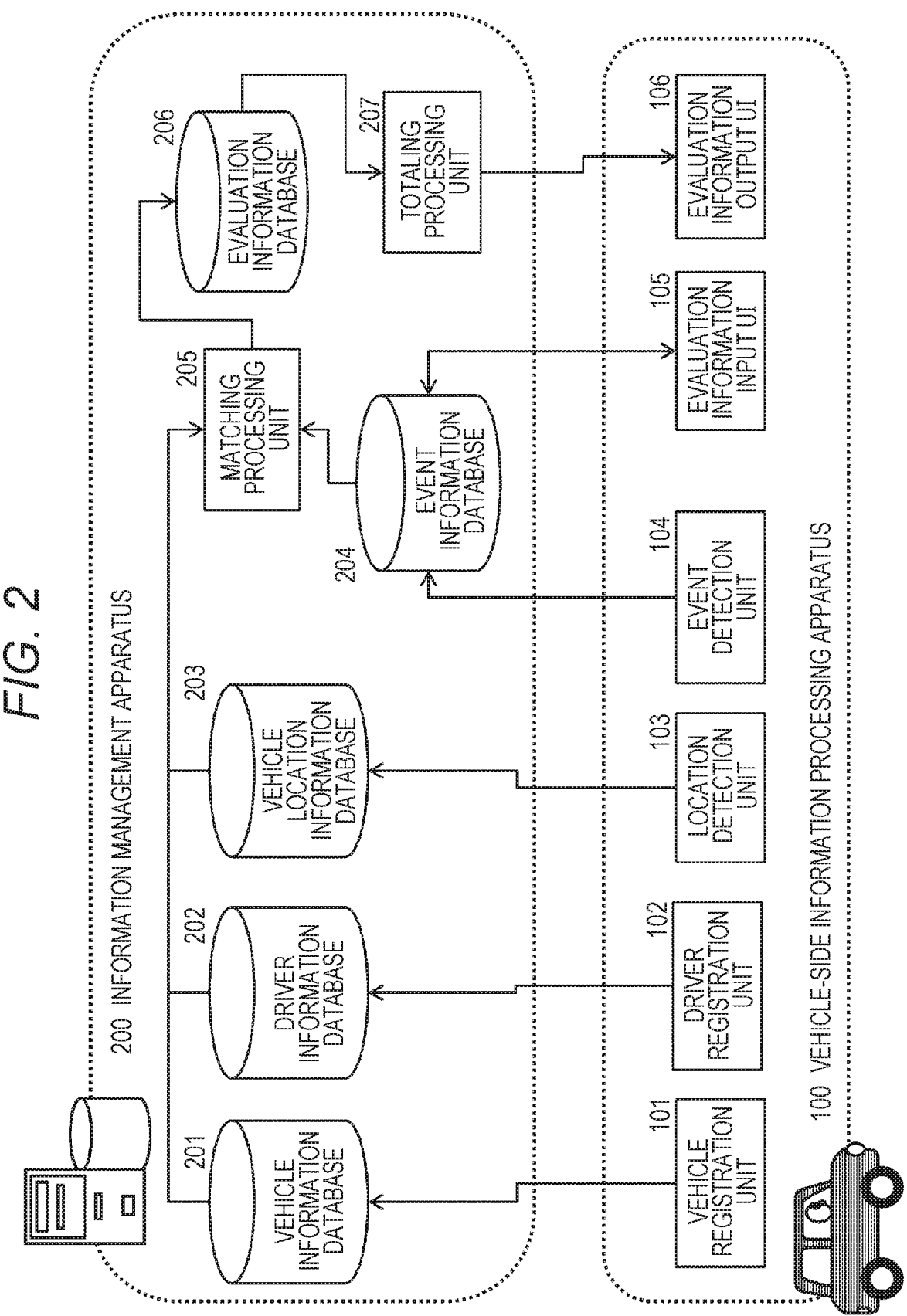
FIG. 2 is a diagram for explaining configurations and processing of a vehicle-side information processing apparatus and an information management apparatus.

FIG. 2 is a block diagram illustrating device configurations of a vehicle-side information processing apparatus 100 and an information management apparatus 200.

Note that, although not illustrated, each of the vehicle-side information processing apparatus 100 and the information management apparatus 200 includes a communication unit and a data processing unit, has a configuration that can communicate with each other via the communication unit, and generates and analyzes transmission and reception data and executes data storage processing to the database by the data processing unit.

A connection line such as an arrow for connecting each unit of the vehicle-side information processing apparatus 100 and the information management apparatus 200 indicates that data is exchanged by communication processing via the communication units of the vehicle-side information processing apparatus 100 and the information management apparatus 200.

As illustrated, the vehicle-side information processing apparatus 100 includes a vehicle registration unit 101, a driver registration unit 102, a location detection unit 103, an event detection unit 1-4, an evaluation information input user interface (UI) 105, and an evaluation information output user interface (UI) 106.

Furthermore, the information management apparatus 200 includes a vehicle information database 201, a driver information database 202, a vehicle location information database 203, an event information database 204, a matching processing unit 205, an evaluation information database 206, and a totaling processing unit 207.

First, the vehicle-side information processing apparatus 100 transmits vehicle information to the information management apparatus 200 via the vehicle registration unit 101. The information management apparatus 200 registers received information in the vehicle information database 201.

Note that it is sufficient that the registration processing be executed only once, for example, at the time of purchasing a car.

The registration processing may be executed by transmitting predetermined registration data from the vehicle-side information processing apparatus 100 to the information management apparatus 200. However, for example, the registration processing can be executed by processing for submitting a sheet on which necessary information is written to an operator of the information management apparatus 200 through mail and the like. Furthermore, the registration processing can be executed in various ways, for example, preparing and applying the necessary information by proxy by a car dealer and the like.

An example of registration data stored in the vehicle information database 201 of the information management apparatus 200 will be described with reference to FIG. 3.

As illustrated in FIG. 3, the vehicle information database 201 stores a vehicle Identifier (ID),
a vehicle type,
a registered driver Identifier (ID), and
vehicle images (front, back, left, and right side images)

in association with each other.

Note that regarding the registered driver Identifier (ID), IDs of a plurality of drivers can be registered for a single vehicle.

The vehicle images (front, back, left, and right sides images) are not limited to the front, back, left, and right still images and may be, for example, video data observed from around the car.

The image data may be set to be provided from a car dealer, a manufacturer, or the like.

Returning to FIG. 2, the description of the configurations and the processing of the vehicle-side information processing apparatus 100 and the information management apparatus 200 will be continued.

The driver registration unit 102 of the vehicle-side information processing apparatus 100 acquires the driver information and the like when the driver gets on the vehicle and starts driving. The acquired information is transmitted to the information management apparatus 200 via the communication unit.

The transmitted information is stored in the driver information database 202 of the information management apparatus 200.

An example of data stored in the driver information database 202 is illustrated in FIG. 4.

As illustrated in FIG. 4, the driver information database 202 stores the driver Identifier (ID),
a vehicle Identifier (ID), and
driving time information
in association with each other.

The driver is a driver who has the registered driver ID registered in the vehicle information database described above with reference to FIG. 3. For example, the driver owns an ID card issued by the information management apparatus 200. The driver ID, the vehicle ID, and the like are recorded on the ID card.

The driver inserts the ID card into a card insertion slot of the driver registration unit 102 of the vehicle at the time of the start of driving.

By inserting the card, the driver ID, the vehicle ID, and the like are read from the ID card and transmitted to the information management apparatus 200.

The information management apparatus 200 stores these pieces of information in the driver information database 202.

Note that the information management apparatus 200 records time information in association with the driver ID and the vehicle ID. First, a driving start time is recorded. Thereafter, the driver registration unit 102 of the vehicle-side information processing apparatus 100 transmits driving stop information and the like of the vehicle to the information management apparatus 200, and the information management apparatus 200 records a stopped time in a case where the driving is stopped. That is, driving time information is recorded.

Note that, in the above example, an example of the registration processing of the driver information and the like using the ID card has been described. However, for example, other configuration may be used that executes processing for identifying and registering a driver through biometric authentication such as a fingerprint.

Returning to FIG. 2, the description of the configurations and the processing of the vehicle-side information processing apparatus 100 and the information management apparatus 200 will be continued.

The location detection unit 103 of the vehicle-side information processing apparatus 100 detects location information of the vehicle. The acquired location information is transmitted to the information management apparatus 200 via the communication unit.

The transmitted information is stored in the vehicle location information database 203 of the information management apparatus 200.

The location detection unit 103 of the vehicle-side information processing apparatus 100 includes, for example, a GPS.

An example of data stored in the vehicle location information database 203 is illustrated in FIG. 5.

As illustrated in FIG. 5, the vehicle location information database 203 stores the vehicle Identifier (ID) and
time-location associated information
in association with each other.

In the time-location associated information, for example, the location information is sequentially recorded in association with location information acquired time at the timing according to measurement intervals of the GPS.

The event detection unit 104 of the vehicle-side information processing apparatus 100 illustrated in FIG. 2 acquires, for example, event information indicating that it is necessary to transmit the evaluation information from the vehicle-side information processing apparatus 100 to the information management apparatus 200, and the acquired event information is transmitted to the information management apparatus 200.

The transmitted event information is stored in the event information database 204 of the information management apparatus 200.

An example of processing of the event detection unit 104 of the vehicle-side information processing apparatus 100 will be described with reference to FIG. 6.

Figure 6:
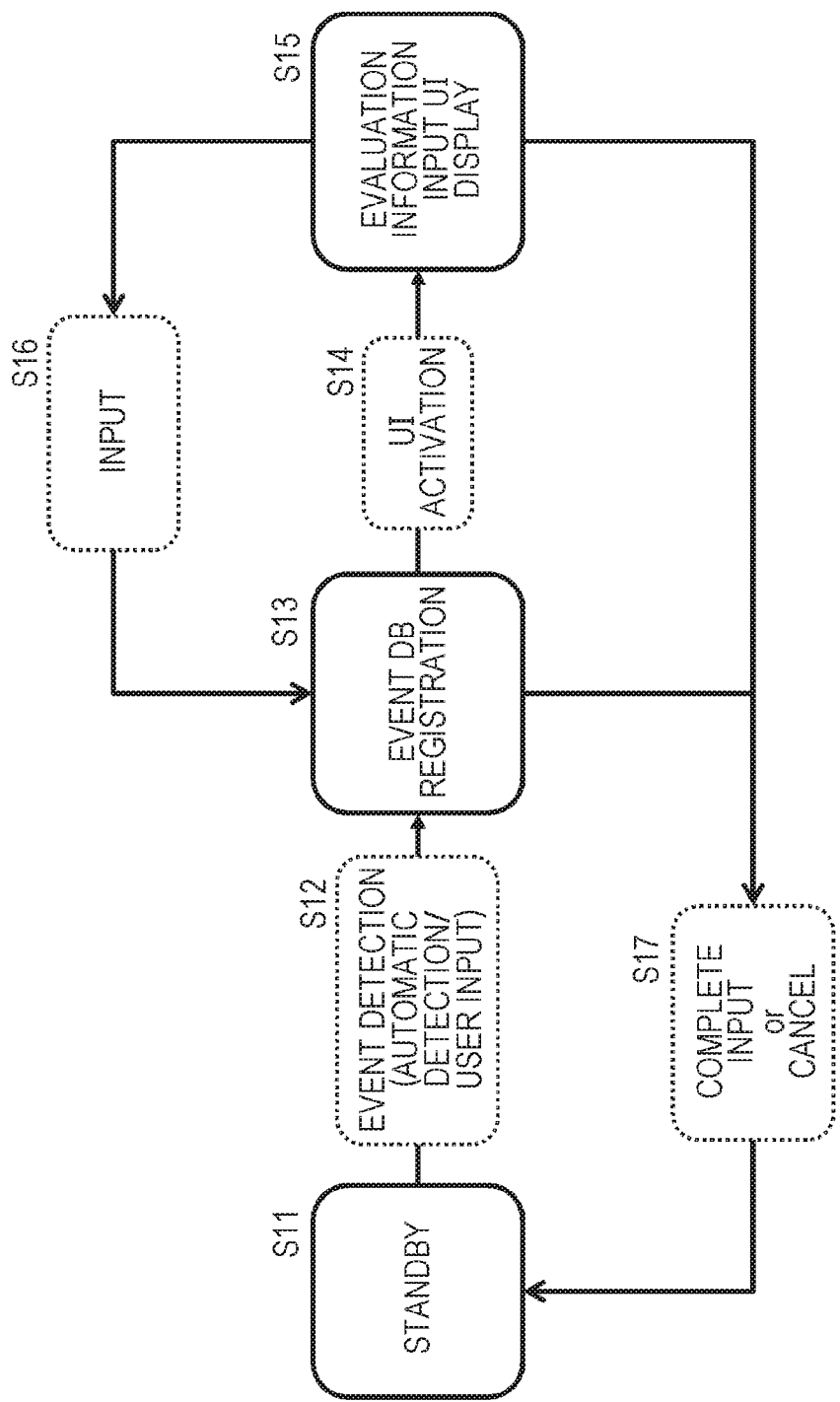
FIG. 6 is a diagram for explaining event detection processing executed by an event detection unit.

FIG. 6 is a state transition diagram for explaining an example of the processing of the event detection unit 104.

For example, in a standby state in step S11, when the driver finds a car, which is dangerously driven, around the driver and desires to transmit driving evaluation information of the dangerous car to the vehicle-side information processing apparatus 100, the driver in step S12 makes an input to an input unit included in the event detection unit 104 of the vehicle-side information processing apparatus 100.

With this input, the procedure proceeds to event database registration processing in step S13.

Alternatively, in a case where a camera attached to the vehicle finds the car which is dangerously driven in step S12, it is automatically determined that the evaluation information should be output, and the procedure proceeds to the event database registration processing in step S13.

The event database registration processing in step S13 is processing for storing an event detected by the event detection unit 104 of the vehicle-side information processing apparatus 100 in the event information database 204 of the information management apparatus 200.

An example of data stored in the event information database 203 is illustrated in FIG. 7.

As illustrated in FIG. 7, the event information database 203 stores
an event Identifier (ID),
date and time information,
an event information output vehicle Identifier (ID),
an event information output vehicle driver Identifier (ID),
an evaluation value (−50 to +50),
an evaluator ID (driver ID in a case where evaluator is driver, sensor (camera and the like) ID in a case of automatic detection (AUTO)), and
evaluation target vehicle information (for example, image)
in association with each other.

The data and time information is data and time information when the event has occurred, and is information regarding an operation time of the input unit by the user or the time information when the camera has found the car which is dangerously driven.

The event information output vehicle Identifier (ID), and the event information output vehicle driver Identifier (ID) are respectively an ID of a vehicle that has output the event information and an ID of a driver of the vehicle.

The evaluation value (−50 to +50) is a value of an input evaluation value in a case of an evaluation value input by the user and in a case where the evaluation value is input by using an evaluation information input user interface (UI) to be described later.

In a case where an automatic evaluation value by the sensor such as a camera, the automatic evaluation value is recorded.

The evaluator ID (driver ID in a case where evaluator is driver and the sensor (camera and the like) ID in a case of the automatic detection (AUTO) are This data is a driver ID as a person who input the evaluation value in a case where the evaluation value is input by using the evaluation information input user interface (UI) to be described later.

In a case of the automatic evaluation value by the sensor such as a camera, the sensor ID of the sensor is recorded.

The evaluation target vehicle information (for example, image) is information for specifying a vehicle to be evaluated and, for example, is imaged data captured by the camera attached to the vehicle.

Returning to FIG. 6, the description regarding the state transition diagram of the event detection unit 104 will be continued.

After the event database registration processing in step S13, in a case where the event registration processing is processing by the user input, user interface (UI) activation processing is executed in step S14, and the procedure proceeds to an evaluation information input UI display processing step in step S15.

An example of a user interface displayed on a display unit of the vehicle in the evaluation information input UI display processing step in step S15 will be described with reference to FIG. 8.

Figure 8:
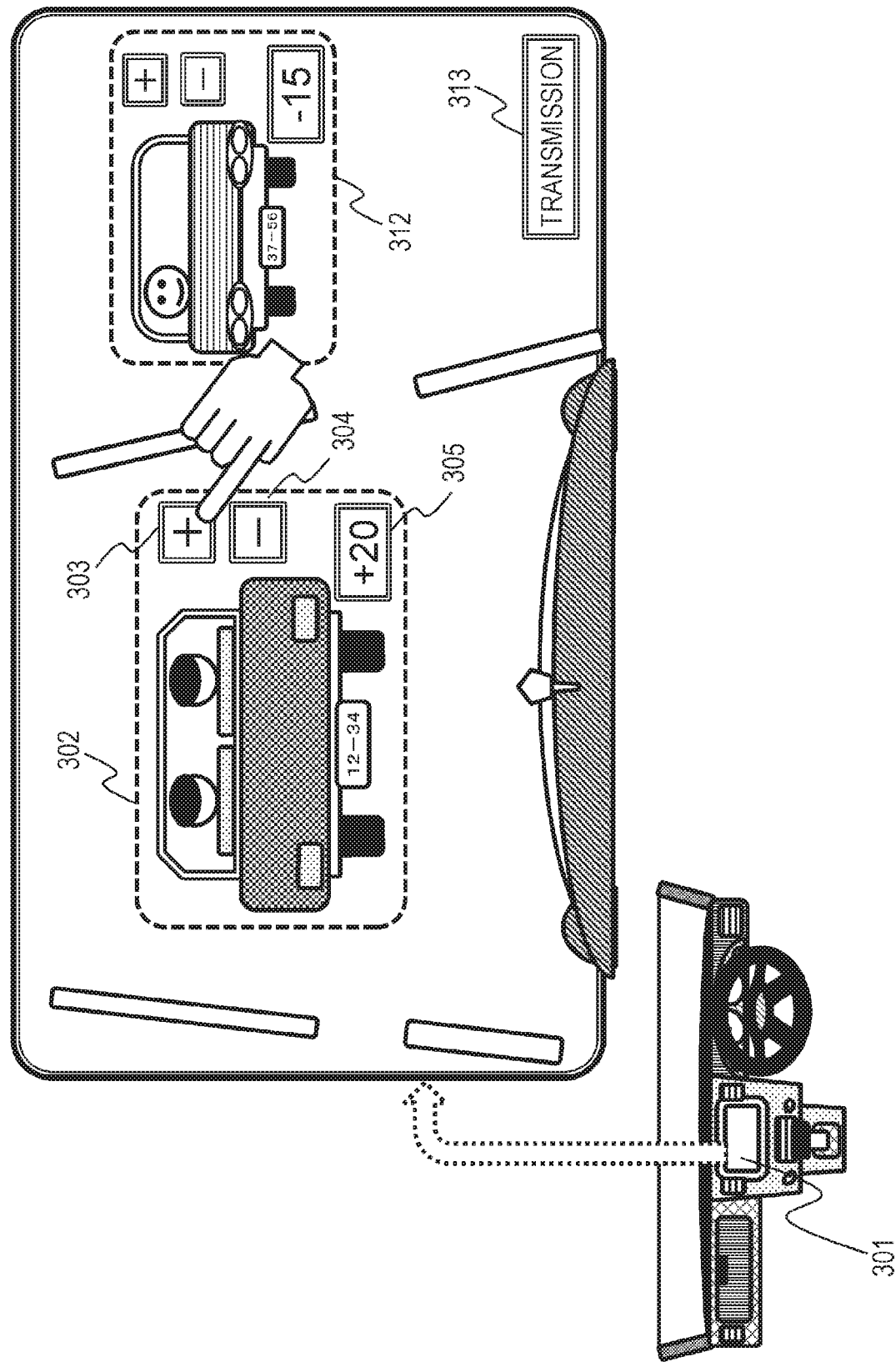
FIG. 8 is a diagram for explaining an example of an evaluation information input UI.

FIG. 8 is a diagram illustrating an example of a UI displayed on a display unit 301 of the vehicle.

A display image on the display unit 301 illustrated in FIG. 8 is an image obtained by capturing the front side of the vehicle by the camera mounted on the vehicle.

Vehicle identification frames 302 and 312 are set for each vehicle included in the display image.

For example, in the vehicle identification frame 302, a plus button 303 and a minus button 304 for evaluation value input and a set evaluation value display region 305 are displayed.

The driver who is the evaluator can set the evaluation value by touching the plus button 303 or the minus button 304.

For example, an evaluation value=0 is displayed in the set evaluation value display region 305 first. The evaluation value is incremented by +five, for example, when the driver who is the evaluator touches the plus button 303 once, the evaluation value is increased by +five, when the driver touches the plus button 303 twice, the evaluation value is increased by +10, and when the driver touches the plus button 303 three times, the evaluation value is increased by +15.

On the other hand, the evaluation value is decremented by −five, for example, when the driver touches the minus button 304 once, the evaluation value is decreased by −5, when the driver touches the minus button 304 twice, the evaluation value is decreased by −10, and when the driver touches the minus button 304 three times, the evaluation value is decreased by −15.

According to such processing, for example, the evaluation values from the minimum evaluation value (−50) to the maximum evaluation value (+50) can be input.

When a transmission button 313 is touched, the input evaluation value is transmitted to the information management apparatus 200 and stored in the event information database 204.

Note that the image of the vehicle identification frame displayed in the UI described with reference to FIG. 8 is transmitted from the vehicle-side information processing apparatus 100 to the information management apparatus 200 together with the event information and is registered in the information management apparatus 200.

The processing corresponds to the processing in steps S15→S16→S13 in the state transition diagram illustrated in FIG. 6.

The processing in step S17 in the state transition diagram illustrated in FIG. 6 is return processing to the standby step that is executed at the time of the event registration processing in step S13 or the evaluation information input UI display processing in step S15, or at the time of cancellation determination processing such as a case where the input of the evaluation information is completed after the above processing or a case where the input has not been made for a certain period of time after the UI display.

Returning to FIG. 2, the description of the configurations and the processing of the vehicle-side information processing apparatus 100 and the information management apparatus 200 will be continued.

The evaluation information input user interface 105 of the vehicle-side information processing apparatus 100 is the UI described with reference to FIG. 8 above, and the user (driver and the like) inputs the evaluation information of the other car by using the UI.

The input evaluation information is stored in the event information database 204 of the information management apparatus 200.

The event information database 204 stores the data described with reference to FIG. 7, that is,
the event Identifier (ID),
the date and time information,
the event information output vehicle Identifier (ID),
the event information output vehicle driver Identifier (ID),
the evaluation value (−50 to +50),
the evaluator ID (driver ID in a case where evaluator is driver, sensor (camera and the like) ID in a case of automatic detection (AUTO)), and the evaluation target vehicle information (for example, image)
in association with each other.

The matching processing unit 205 of the information management apparatus 200 executes matching processing of the data stored in the event information database 204 and
the information stored in each of
the vehicle information database 201,
the driver information database 202, and
the vehicle location information database 203.

Specifically, the matching processing unit 205 executes processing for specifying, for example, an evaluation target vehicle and a driver thereof.

Each of
the vehicle information database 201,
the driver information database 202, and
the vehicle location information database 203 stores
the following information regarding two vehicles, i.e., the event information
regarding the event information output vehicle stored in the event information database 204 and the vehicle corresponding to the evaluation target vehicle information, that is,
the vehicle ID,
the driver ID, and
the location information.

The matching processing unit 205 executes the matching processing of the data stored in the event information database 204 and
the data stored in each of
the vehicle information database 201,
the driver information database 202, and
the vehicle location information database 203, and verifies whether or not the event information output vehicle, the evaluation target vehicle, the driver, and the date and time of the event, the location, and the like are stored as the registered data in which the pieces of data are correctly associated with each other.

When the matching processing is completed and the evaluation target vehicle and the driver are successfully specified, the evaluation information is stored in the evaluation information database 206.

An example of data stored in the evaluation information database 206 will be described with reference to FIG. 9.

As illustrated in FIG. 9, the evaluation information database 206 stores the following data.
The date and time information,
the location information,
the evaluation target vehicle ID,
an evaluation target driver ID,
the evaluation value (+50 to −50), and
the evaluator ID
are stored in association with each other.

The date and time information and the location information are respectively a data and time when the evaluation processing is executed and location information of the evaluation target vehicle.

The evaluation target vehicle ID and the evaluation target driver ID are respectively identifiers of a vehicle and a driver to be evaluated.

The evaluator ID and the evaluation value (+50 to −50) are respectively, for example, the ID and the evaluation value of the driver who has executed the evaluation processing.

Each piece of data is acquired from any one of the databases including
the event information database 204 or
the vehicle information database 201,
the driver information database 202, and
the vehicle location information database 203
which are applied to the matching processing.

In the evaluation information database 206, only reliable information of which the evaluation target vehicle and the driver of the vehicle can be specified by the matching processing is registered, and registration of wrong information can be prevented.

The totaling processing unit 207 performs totalization and analysis processing by using the data stored in the evaluation information database 206 and generates information provided to the driver, information provided to the insurance company, and the like.

The generated information is output to, for example, the evaluation information output user interface (UI) 106 of the vehicle-side information processing apparatus 100.

An information output example to the evaluation information output user interface (UI) 106 will be described later.

Note that the specific example of the evaluation information input UI 105 has been described with reference to FIG. 8. However, the example of the evaluation information input UI 105 illustrated in FIG. 8 is an example, and various other UIs can be used.

Figure 10:
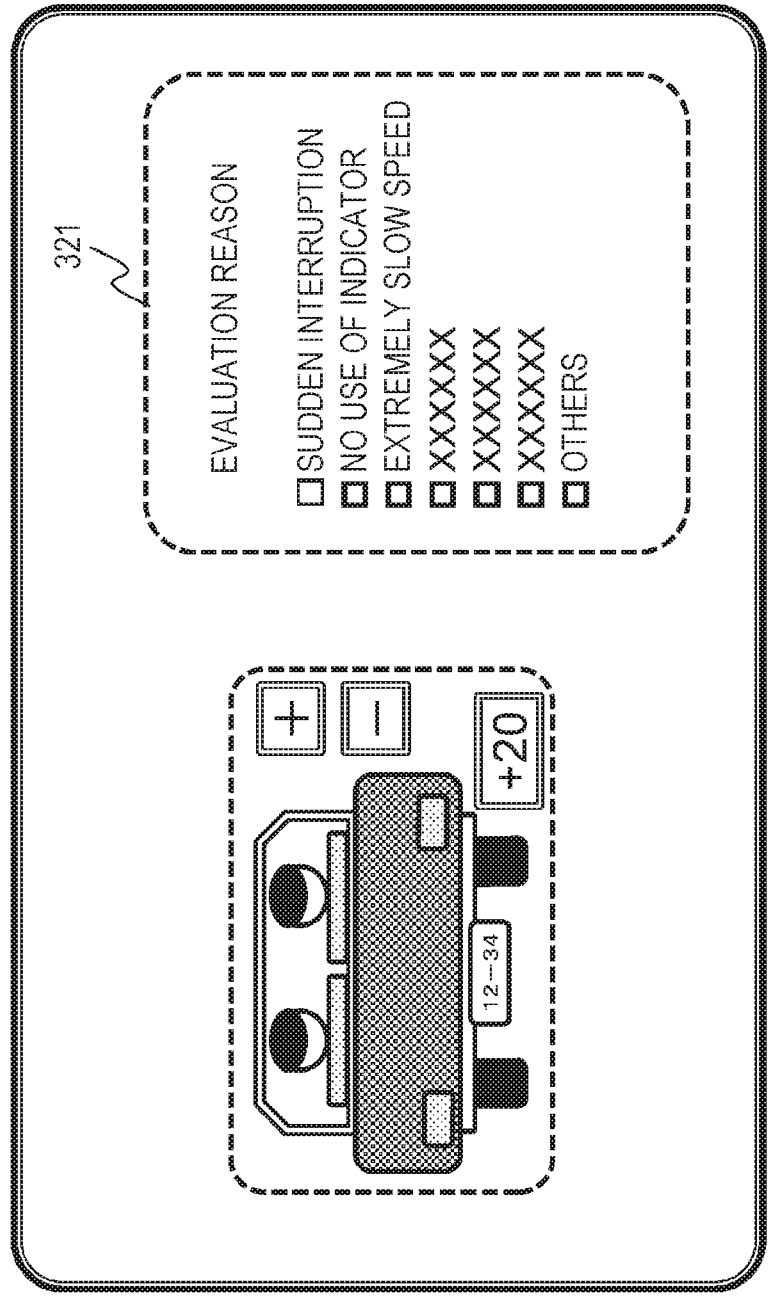
FIG. 10 is a diagram for explaining an example of the evaluation information input UI.

FIG. 10 illustrates a specific example of the evaluation information input UI 105 different from the UI illustrated in FIG. 8.

In the specific example of the evaluation information input UI 105 illustrated in FIG. 10, an evaluation reason input region 321 in which an evaluation reason is written is set. By touching any one of items in the evaluation reason input region 321, the evaluator transmits the evaluation reason to the information management apparatus 200 together with the evaluation value.

The information management apparatus 200 can register the evaluation reason in the event information database 204 and the evaluation information database 206 together with the evaluation value.

[3. Information Provision Processing Using Evaluation Information]

Next, an example of information generated and provided by the totaling processing unit 207 of the information management apparatus 200 by using the data stored in the evaluation information database 206, for example, information provided to the driver and the like will be described.

Figure 11:
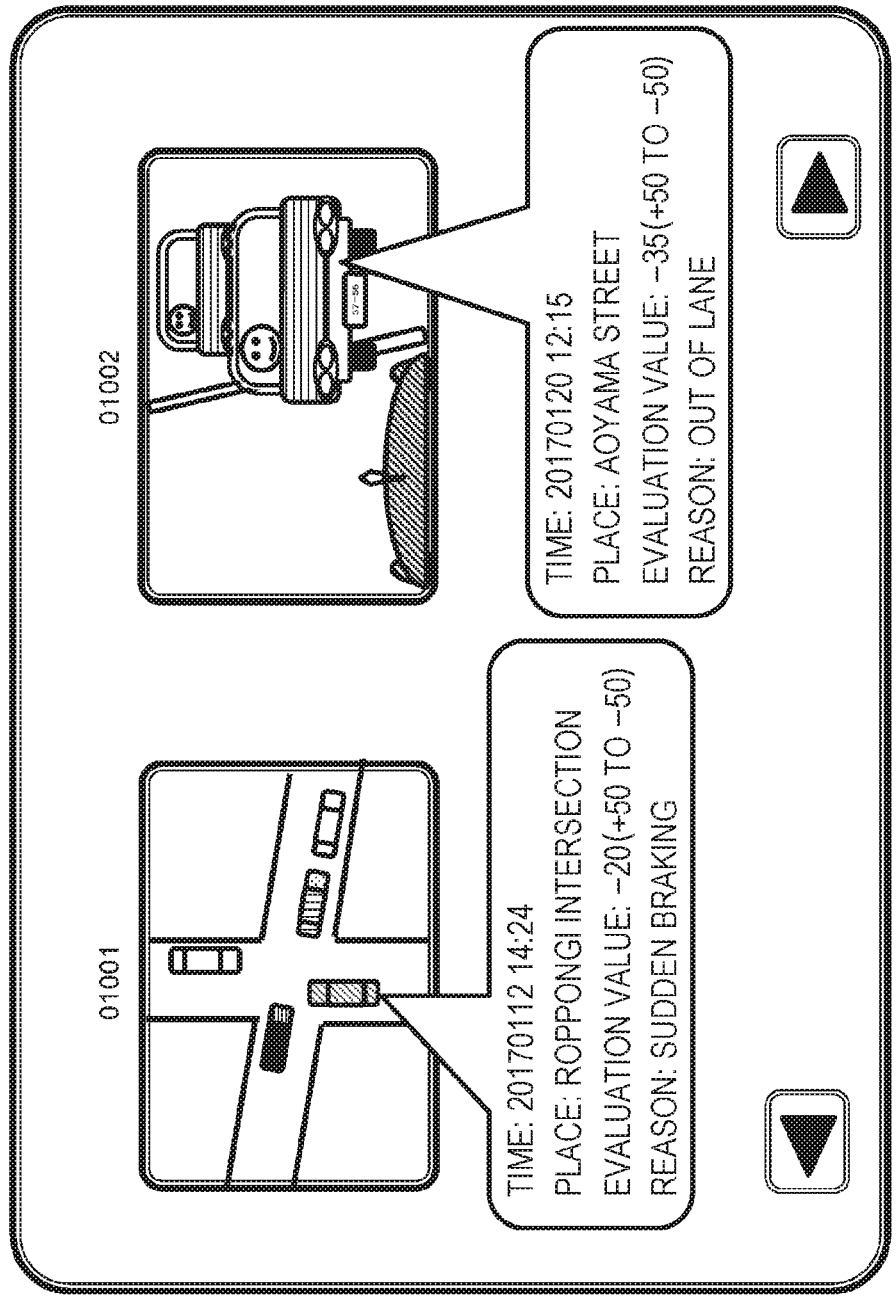
FIG. 11 is a diagram for explaining an output example of evaluation information.

FIG. 11 is a diagram illustrating an example of the information generated and provided by the totaling processing unit 207 of the information management apparatus 200 by using the data stored in the evaluation information database 206.

In FIG. 11, an example of the information is illustrated that is transmitted from the information management apparatus 200 to the vehicle-side information processing apparatus 100 and displayed on a display unit of an automobile.

This is an information output example to the evaluation information output user interface (UI) 106 of the vehicle information processing apparatus 100 illustrated in FIG. 2.

The example illustrated in FIG. 11 is an example of information provided to the evaluation target person who has received low evaluation (evaluation value=−50 to zero) from another person.

A date and time and a place of the low evaluation, an evaluation value, an evaluation reason are displayed together with an image (map or captured image).

The driver can reflect on his/her driving according to the provided information.

FIGS. 12A, 12B, and 12C are examples of information provided to the driver by generating a summary of evaluation data of a specific driver for a predetermined period, for example, six months by the information management apparatus 200.

The display information illustrated in FIGS. 12A, 12B, and 12C is information transmitted from the information management apparatus 200 to the vehicle-side information processing apparatus 100 and displayed on the display unit of the automobile as in FIG. 11.

The summary data includes the following data.

FIG. 12A Monthly average evaluation value

FIG. 12B Reason for low evaluation

FIG. 12C Overall evaluation

FIG. 12A The monthly average evaluation value is data obtained by averaging evaluation values of the driver acquired in six months (January to June) on a monthly basis.

FIG. 12B The reason for low evaluation is statistical data of the reason for low evaluation acquired as the evaluation values of the driver acquired in six months (January to June).

FIG. 12C The overall evaluation is overall evaluation information generated on the basis of the evaluation values and the evaluation reason for six months.

The examples of the provided information illustrated in FIGS. 11, 12A, 12B, and 12C are examples of feedback information provided to the evaluated driver.

The information management apparatus 200 can generate and provide the feedback information to an evaluation execution subject who made an evaluation, in addition to the above information.

Figure 13A:
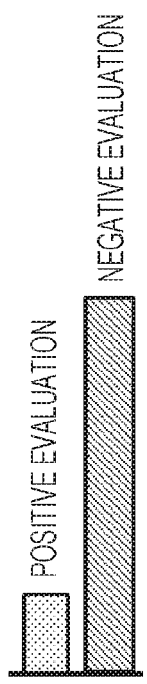
Figure 13C:
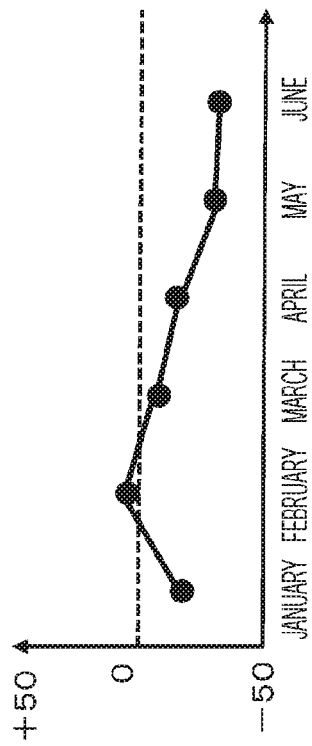

FIGS. 13A, 13B, and 13C illustrate an example of the feedback information to the evaluation execution subject.

FIGS. 13A, 13B, and 13C are examples of summary information of evaluation data of a specific evaluation executor (driver) for a predetermined period, for example, six months generated by the information management apparatus 200.

The display information illustrated in FIGS. 13A, 13B, and 13C is information transmitted from the information management apparatus 200 to the vehicle-side information processing apparatus 100 and displayed on the display unit of the automobile as in FIGS. 11, 12A, 12B, and 12C.

The summary data includes the following data.

FIG. 13A Evaluation value statistics

FIG. 13B Monthly average evaluation value

FIG. 13C Request for evaluation value setting

FIG. 13A The evaluation value statistics is a graph indicating the number of positive evaluations and negative evaluations in the evaluation processing executed by the evaluator during the past half year.

FIG. 13B The monthly average evaluation value is a graph indicating a monthly average value of the evaluation values in the evaluation processing executed by the evaluator during the past half year.

FIG. 13C The request for evaluation value setting is a message generated by the information management apparatus 200 on the basis of FIG. 13A Evaluation value statistics and FIG. 13B Monthly average evaluation value and is message information for executing neutral evaluation.

In this way, the information management apparatus 200 can generate and provide various feedback information to the evaluator and the person to be evaluated on the basis of the evaluation information stored in the evaluation information database 200.

[4. Processing for Notifying Approach of Dangerous Driving Vehicle]

As described with reference to FIGS. 11, 12A, 12B, 12C, 13A, 13B, and 13C, the information management apparatus 200 can generate and provide various feedback information to the evaluator and the person to be evaluated on the basis of the evaluation information stored in the evaluation information database 200.

The information management apparatus 200 can further execute processing for notifying each vehicle that the dangerous driving vehicle is approaching on the basis of the evaluation information stored in the evaluation information database 200.

The processing example will be described with reference to FIG. 14 and the subsequent drawings.

Figure 14:
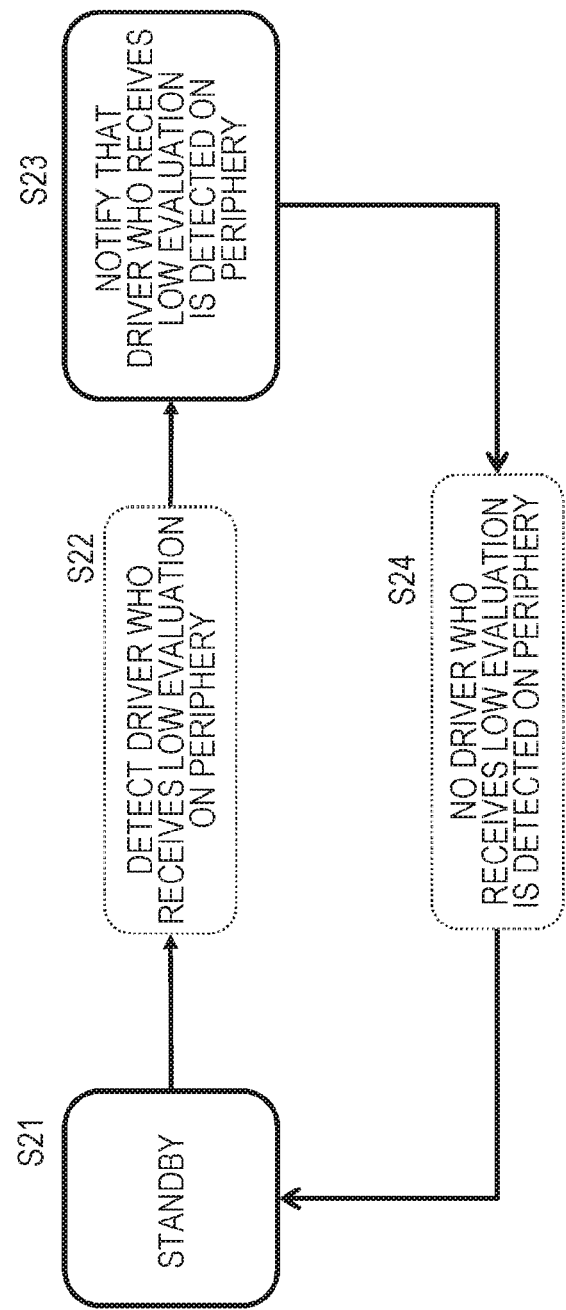

FIG. 14 is a state transition diagram illustrating a processing state of the data processing unit of the information management apparatus 200 that executes the processing for notifying each vehicle that the dangerous driving vehicle is approaching.

As described with reference to FIG. 1, the information management apparatus 200 continuously receives the vehicle information, the driver information, the location information, and the evaluation information from a vehicle that is traveling on a road.

The information management apparatus 200 stores the data stored in the evaluation information database described with reference to FIG. 9 above on the basis of the evaluation information, that is, the date and time information, the location information, the evaluation target vehicle ID, the evaluation target driver ID, the evaluation value (+50 to −50), and the evaluator ID in association with the evaluation information database 206.

The information management apparatus 200 can constantly grasp the position of the vehicle (dangerous driving vehicle) that has received low evaluation on the basis of the data stored in the evaluation information database 206.

The information management apparatus 200 executes the processing for notifying each vehicle that the dangerous driving vehicle is approaching by using the location information of the dangerous driving vehicle.

In the state transition diagram illustrated in FIG. 14, step S21 is a normal standby state.

For example, in a case where another vehicle (vehicle A) is detected in a traveling direction of the dangerous driving vehicle in step S22, the procedure proceeds to step S23, and the notification that the vehicle that has received low evaluation (dangerous driving vehicle) is approaching is issued to the vehicle A.

Figure 15:
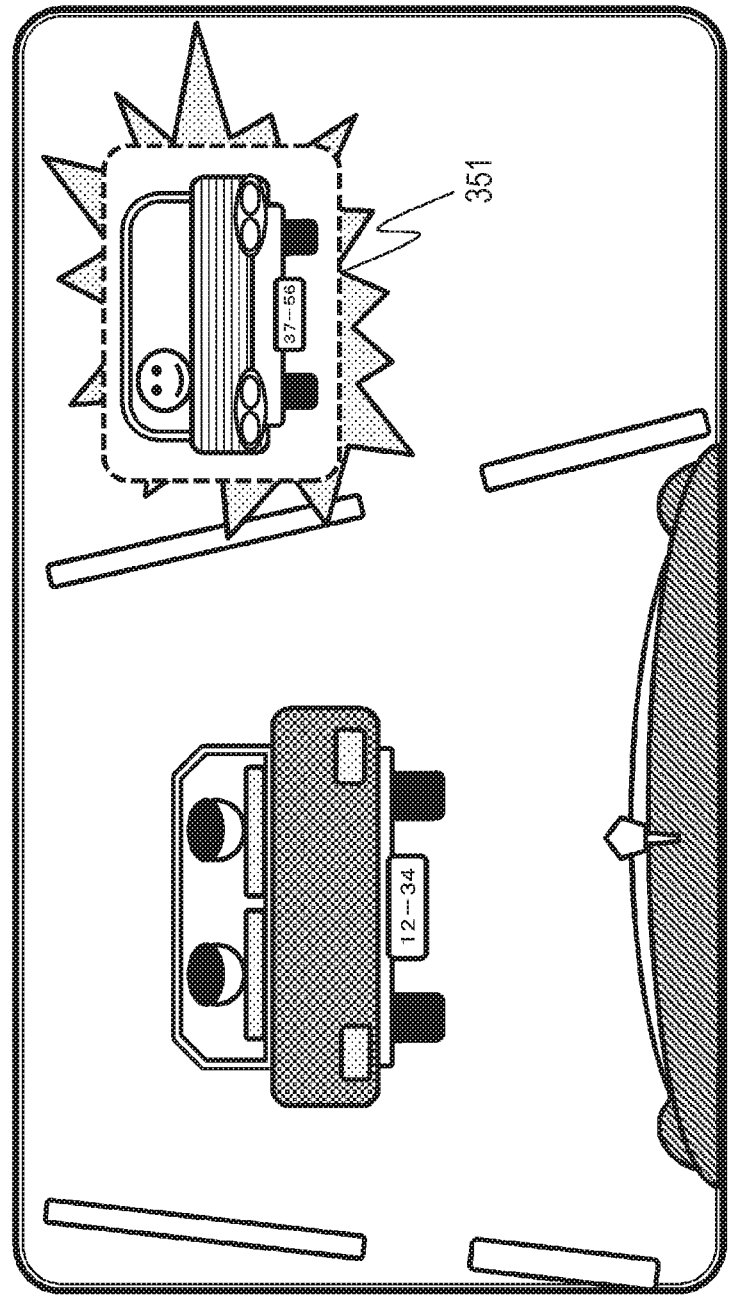

A specific example of the notification information is illustrated in FIG. 15.

FIG. 15 is a diagram illustrating an example of a display image of a display unit of the vehicle A which receives the notification.

An image captured by a camera of the vehicle A is displayed on the display unit of the vehicle A. Moreover, a warning frame 351 for identifying the vehicle that has received low evaluation (dangerous driving vehicle) is displayed around the dangerous driving vehicle.

The vehicle is set on the basis of identification information of the vehicle identified on the basis of the data stored in the evaluation information database 206 by the information management apparatus 200.

By looking at the display image, a driver of the vehicle A can recognize that an oncoming vehicle is a dangerous driving vehicle in advance and can avoid danger by deceleration processing and the like.

Note that the present disclosure is not limited to the dangerous vehicle display processing as illustrated in FIG.

15 and, for example, a configuration may be used that outputs warning sound via a warning sound output unit included in the vehicle.

Thereafter, when the dangerous driving vehicle moves away, the notification processing is terminated, and the state returns to the standby state.

That is, processing in step S24 in FIG. 14 is executed.

[5. Exemplary Processing Applied to Insurance Premium Calculation of Telematics Insurance]

Next, an example will be described in which the information management apparatus 200 provides the data stored in the evaluation information database 206 or the analysis data thereof to the insurance company and the insurance company calculates an insurance premium on the basis of the received data.

First, an outline of a telematics insurance will be described with reference to FIG. 16.

As described above, there are two types of telematics insurance including the pay as you drive (PAYD) type of which an insurance premium is linked to only a travel distance and a pay how you drive (PHYD) type of which an insurance premium is calculated in consideration of driving characteristics of a driver, for example, driving characteristics such a frequency of sudden braking, sudden start, and the like.

For the pay as you drive (PHYD) type telematics insurance, an insurance premium is calculated on the basis of the driving characteristics of the driver.

The outline of insurance premium calculation processing will be described with reference to FIG. 16 and the subsequent drawings.

Figure 16:
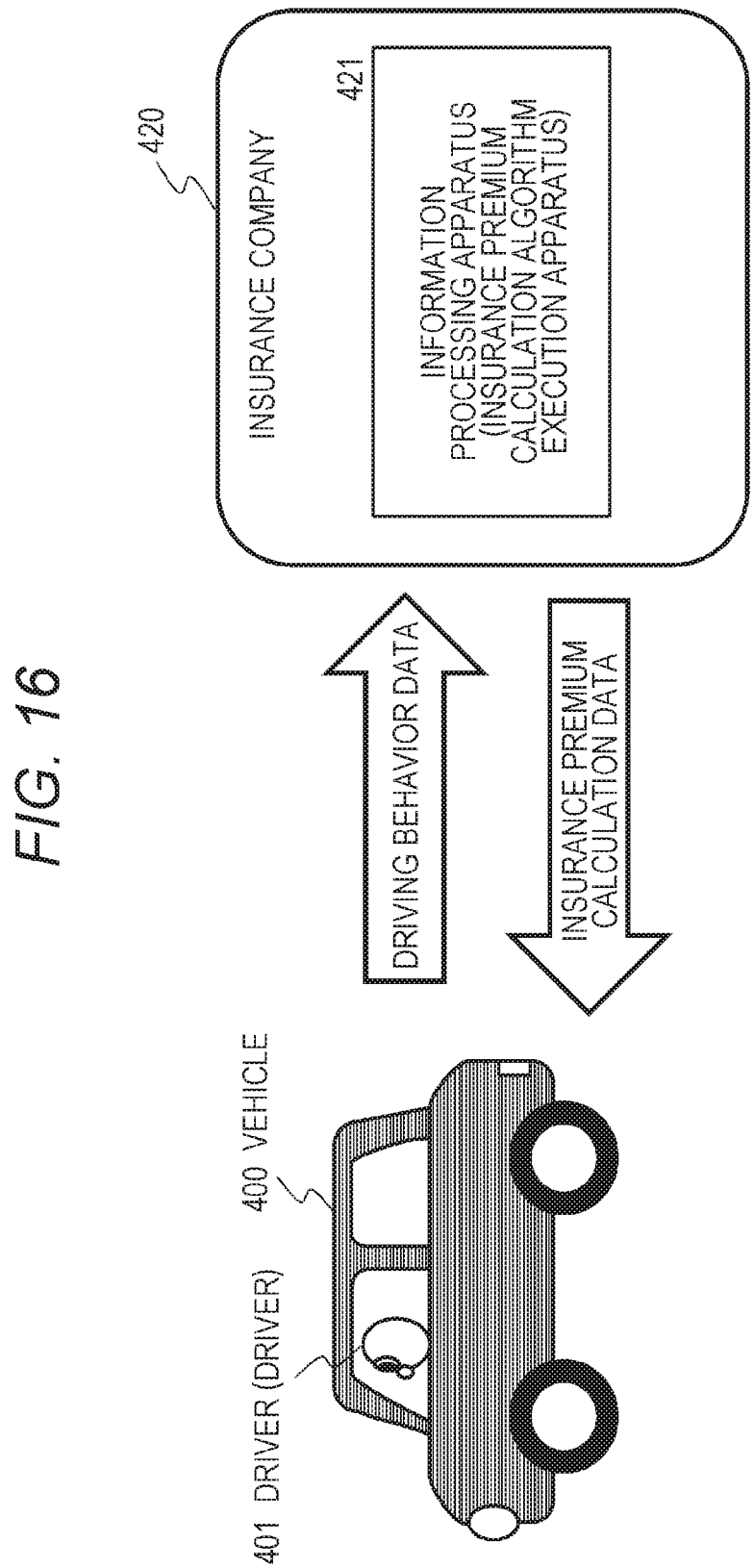

In FIG. 16, a vehicle 400 and an insurance company 420 are illustrated.

A driver 401 as an insurance premium calculation target gets on and drives the vehicle 400.

Various sensors that acquire the driving characteristics are provided in the vehicle 400. Specifically, various driving behavior data acquisition devices are provided such as acquisition devices of a travel distance and a travel speed information, a detection sensor that detects sudden braking, sudden start, and sudden steering, a device that detects a time band when driving is performed, and the like.

Data acquired by the driving behavior data acquisition device provided in the vehicle 400 is transmitted to an information processing apparatus 421 of the insurance company 420 via a communication unit of the vehicle, for example.

Note that the data may be sequentially transmitted or a configuration may be used in which data acquired in a predetermined period, for example, one week or one month is accumulated in a storage unit in the vehicle 400 and the accumulated data is collectively transmitted.

Alternatively, the driver 401 may submit a medium in which the data stored in the storage unit of the vehicle 400 is recorded to the insurance company 420.

The information processing apparatus 421 of the insurance company 420 analyzes driving behavior data in units of a predetermined period, calculates an insurance premium based on the driving characteristics of the driver 401, and charges the insurance premium.

This is setting in which, for example, in a case where an insurance premium calculation premium is set to one month, if it determined that the number of dangerous driving records is small during the calculation period of one month, the insurance premium is reduced, and if it is determined that the number of dangerous driving records is large, the insurance premium is increased.

The information processing apparatus 421 of the insurance company 420 calculates the insurance premium according to an insurance premium calculation algorithm set by the insurance company.

Figure 17:
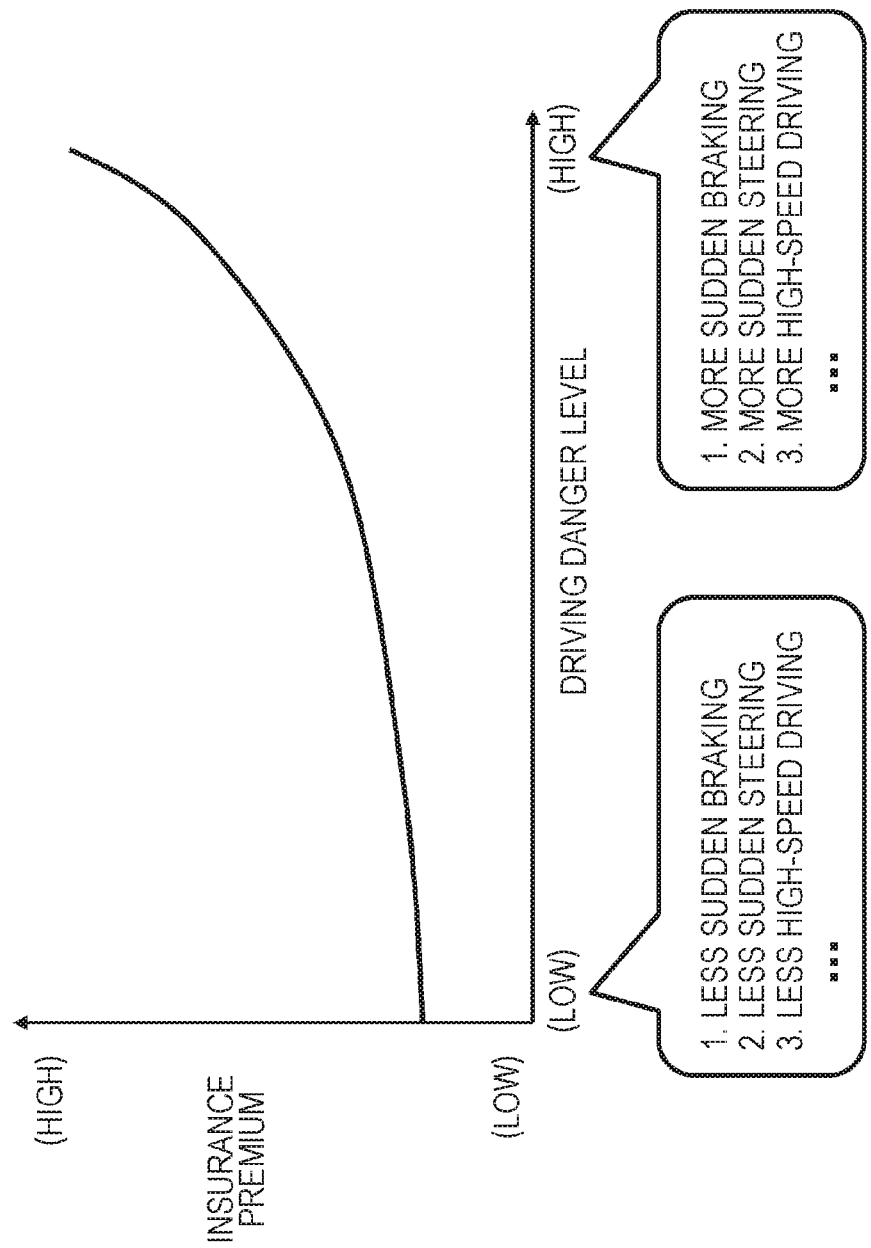

Specifically, for example, the insurance premium is determined according to the setting illustrated in FIG. 17.

The horizontal axis of the graph illustrated in FIG. 17 indicates a driving danger level, and setting is made such that the left side indicates a lower danger level and the right side indicates a higher danger level.

The vertical axis indicates the calculated insurance premium, and the upper side indicates a higher insurance premium.

The driving danger level is determined on the basis of the data acquired from the driving behavior data acquisition device provided in the vehicle 400. Specifically, in a case where the number of times of sudden braking, sudden start, sudden steering, or high speed driving is large, it is determined that the danger level is high.

When such a determination is made, the calculated insurance premium is set to be high.

In this way, for the pay as you drive (PHYD) type telematics insurance, the insurance premium is calculated on the basis of the driving characteristics of the driver.

Specifically, for example, in a case where sudden braking, sudden start, sudden steering are frequently used, it is determined that the number of times of dangerous driving is large, and the insurance premium is set to be high.

However, for example, sudden braking is often used to avoid danger, and there are many opinions that there is a problem in that the insurance premium is set to be high due to the number of times of sudden braking.

As a method of preventing such a problem, it is considered that driving evaluation by others is effective.

For example, a driver whose monthly average value of evaluation values of driving evaluation by the others is positive, the insurance premium is set to be low.

On the other hand, a driver whose monthly average value of evaluation values of driving evaluation by the others is negative, the insurance premium is set to be high.

The insurance premium can be set in this way.

An example of insurance premium setting to which the driving evaluation value by the others is illustrated in FIG. 18.

As in FIG. 17, the horizontal axis of the graph illustrated in FIG. 18 indicates the driving danger level, and setting is made such that the left side indicates a lower danger level and the right side indicates a higher danger level.

The vertical axis indicates the calculated insurance premium, and the upper side indicates a higher insurance premium.

In FIG. 18, three lines are illustrated.

A line A is a reference insurance premium setting line and is an insurance premium setting line in a case where the driving evaluation value is not considered.

A line B is a higher insurance premium setting line and is an insurance premium setting line, for example, in a case where an average of the driving evaluation values for a predetermined period in the past indicates negative evaluation (low evaluation).

Furthermore, a line C is a lower insurance premium setting line and is an insurance premium setting line, for example, in a case where an average of the driving evaluation values for a predetermined period in the past indicates positive evaluation (high evaluation).

In this way, the insurance premium can be calculated in consideration of the driving evaluation value by the others.

[6. Exemplary Configuration of Information Processing Apparatus]

Next, an exemplary hardware configuration of an information processing apparatus which can be applied as the vehicle-side information processing apparatus 100 and the information management apparatus 200 described with reference to FIG. 2 will be described with reference to FIG. 19.

A central processing unit (CPU) 501 functions as a data processing unit which executes various processing according to a program stored in a read only memory (ROM) 502 or a storage unit 508. For example, processing according to the sequence described in the above embodiment is executed. A random access memory (RAM) 503 stores the program executed by the CPU 501, data, and the like. The CPU 501, the ROM 502, and the RAM 503 are connected to each other by a bus 504.

The CPU 501 is connected to an input/output interface 505 via the bus 504, and the input/output interface 505 is connected to an input unit 506 including various switches, a keyboard, a touch panel, a mouse, a microphone, or the like and an output unit 507 including a display, a speaker, or the like.

Note that the input unit 506 of the vehicle-side information processing apparatus 100 includes a user interface, a sensor, a camera, a GPS, and the like.

The output unit 506 of the vehicle-side information processing apparatus 100 includes a user interface. Furthermore, a warning sound output unit is also included.

The CPU 501 inputs a command input from the input unit 506 and detection information from a driving behavior detection unit (sensor, camera, GPS, and the like) 521, executes various processing, and outputs the processing result to, for example, the output unit 507.

The storage unit 508 connected to the input/output interface 505 includes, for example, a hard disk and the like and stores the program executed by the CPU 501 and various data. A communication unit 509 functions as a transceiver for data communication via a network such as the Internet and a local area network and further functions as a transmission and reception unit of broadcast waves and communicates with external devices.

A drive 510 connected to the input/output interface 505 drives a removable medium 511 such as a magnetic disk, an optical disk, a magneto-optical disk, or a semiconductor memory such as a memory card and records or reads data.

[7. Summary of Configuration of Present Disclosure]

The embodiments of the present disclosure have been described in detail with reference to the specific embodiments above. However, it is obvious that those skilled in the art can make modifications and substitutions of the embodiments without departing from the gist of the present disclosure. In other words, the present disclosure has been disclosed in a form of exemplification and is not restrictively interpreted. Claims should be considered in order to determine the gist of the present disclosure.

Note that the technology disclosed in the present specification can have the following configuration.

(1) An information processing apparatus including:

an evaluation information input unit configured to input evaluation information regarding driving of another vehicle; and a communication unit configured to transmit the evaluation information input by the evaluation information input unit to an information management apparatus.

(2) The information processing apparatus according to (1), in which the evaluation information input unit is a user interface using a display unit that displays an image captured by a camera, and is an input unit that can input an evaluation value indicating positive evaluation or negative evaluation regarding the another vehicle displayed on the display unit.

(3) The information processing apparatus according to (1) or (2), further including:

a driver registration unit configured to input driver information, in which the communication unit transmits the driver information input via the driver registration unit to the information management apparatus.

(4) The information processing apparatus according to any one of (1) to (3), further including:

a location detection unit configured to detect location information, in which the communication unit transmits the location information detected by the location detection unit to the information management apparatus.

(5) The information processing apparatus according to any one of (1) to (4), further including:

an event detection unit configured to detect event information, in which the communication unit transmits the event information detected by the event detection unit to the information management apparatus.

(6) The information processing apparatus according to (5), in which the event information includes event information based on input processing indicating an evaluation information input intention of a user.

(7) The information processing apparatus according to (5), in which the event information includes event information based on detection of a dangerous vehicle based on an image captured by a camera.

(8) The information processing apparatus according to any one of (1) to (7), further including:

an output unit configured to output evaluation information transmitted by the information management apparatus.

(9) The information processing apparatus according to (8), in which the output unit inputs driving evaluation information of an own vehicle from the information management apparatus and outputs the input information.

(10) The information processing apparatus according to (8), in which the output unit inputs a summary of driving evaluation information made for the another vehicle from the information management apparatus and outputs the input information.

(11) An information processing apparatus including:

a communication unit configured to receive evaluation information regarding driving of another car from a vehicle;

an evaluation information database configured to store the evaluation information; and a totaling processing unit configured to execute analysis processing based on data stored in the evaluation information database.

(12) The information processing apparatus according to (11), in which the information processing apparatus acquires at least any one of vehicle information, driver information, or location information from the vehicle, and executes processing for specifying at least any one of an evaluation target vehicle or an evaluation target driver by executing matching processing on data received together with the evaluation information and at least any one of the vehicle information, the driver information, or the location information.

(13) The information processing apparatus according to (11) or (12), in which the information processing apparatus transmits a result of the analysis processing, based on the data stored in the evaluation information database, executed by the totaling processing unit to the vehicle.

(14) An information processing system including:

a vehicle-side information processing apparatus; and an information management apparatus, in which the vehicle-side information processing apparatus includes an evaluation information input unit that inputs evaluation information regarding driving of another vehicle, and a communication unit that transmits the evaluation information input to the evaluation information input unit to the information management apparatus, and the information management apparatus includes a communication unit that receives the evaluation information from the vehicle-side information processing apparatus, an evaluation information database that stores the evaluation information, and a totaling processing unit that executes analysis processing based on data stored in the evaluation information database.

(15) An information processing method executed by an information processing apparatus, the method including:

input detection processing of detecting input processing of evaluation information regarding driving of another vehicle to an evaluation information input unit; and data transmission processing of transmitting the evaluation information input to the evaluation information input unit to an information management apparatus via a communication unit.

(16) An information processing method executed by an information processing apparatus, the method including:

a communication step of receiving evaluation information regarding driving of another car from a vehicle via a communication unit;

a step of storing the evaluation information in an evaluation information database by a data processing unit; and a totaling step of executing analysis processing based on data stored in the evaluation information database by a totaling processing unit.

(17) A program for causing an information processing apparatus to execute information processing including:

input detection processing of detecting input processing of evaluation information regarding driving of another vehicle to an evaluation information input unit; and data transmission processing of transmitting the evaluation information input to the evaluation information input unit to an information management apparatus via a communication unit.

(18) A program for causing an information processing apparatus to execute information processing including:

a communication step of receiving evaluation information regarding driving of another car from a vehicle via a communication unit;

a step of storing the evaluation information in an evaluation information database by a data processing unit; and a totaling step of executing analysis processing based on data stored in the evaluation information database by a totaling processing unit.

Furthermore, the series of processing described in the specification can be executed by hardware, software, or a composite configuration of the hardware and the software. In a case where the processing is executed by the software, it is possible that a program in which a processing sequence has been recorded is installed in a memory, which is built in dedicated hardware, in a computer and executed or the program is installed in a general computer which can execute various processing and executed. For example, the program can be recorded in a recording medium in advance. In addition to installing the program from the recording medium to the computer, it is possible that the program is received via a network such as a local area network (LAN) or the Internet and installed to a recording medium such as a built-in hard disk.

Note that various processing described in the present specification is not only executed in time series according to the description, and may be executed in parallel or individually according to a processing capability of an apparatus for executing the processing or as necessity. Furthermore, in the present specification, the system is a logical group configuration of a plurality of devices, and the devices of the configuration are not limited to be housed in the same casing.

INDUSTRIAL APPLICABILITY

As described above, according to the configuration of one embodiment of the present disclosure, a configuration is realized that can acquire and accumulate driving evaluation data of another car from a vehicle and evaluate driving of a driver of each vehicle.

Specifically, for example, vehicle information, driver information, and location information are transmitted from a vehicle-side information processing apparatus to an information management apparatus, and in addition, evaluation information regarding driving of the other vehicle is transmitted to the information management apparatus. The information management apparatus receives the vehicle information, the driver information, and the location information from the vehicle and stores the received information in a database and receives evaluation information and time information, driver information, and the like at the time of evaluation. By matching processing on the data stored in the database and the data received together with the evaluation information, an evaluation target vehicle and a driver are specified, stored in an evaluation information database, and analysis processing based on the stored data is executed, and the analysis result is provided to the driver and the like.

According to this configuration, a configuration is realized that enables to acquire and accumulate driving evaluation data of another car from a vehicle and evaluate driving of a driver of each vehicle.

REFERENCE SIGNS LIST 11, 12, 13 Car
21, 22, 23 Driver (driver)
30 Information management apparatus
40 Insurance company
100 Vehicle-side information processing apparatus
101 Vehicle registration unit
102 Driver registration unit
103 Location detection unit
104 Event detection unit
105 Evaluation information input user interface (UI)
106 Evaluation information output user interface (UI)

200 Information management apparatus
201 Vehicle information database
202 Driver information database
203 Vehicle location information database
204 Event information database
205 Matching processing unit
206 Evaluation information database
207 Totaling processing unit
400 Vehicle
401 Driver
420 Insurance company
421 Information processing apparatus
501 CPU
502 ROM
503 RAM
504 Bus
505 Input/output interface
506 Input unit
507 Output unit
508 Storage unit
509 Communication unit
510 Drive
511 Removable medium

The invention claimed is:

1. An information processing apparatus, comprising:
a Central Processing Unit (CPU) configured to:
acquire event information associated with a target vehicle;
control, based on the acquired event information, a display screen to display a user interface;
control reception of first evaluation information via the user interface, wherein
the first evaluation information includes:
an evaluation value of the target vehicle, and
evaluation reason information that indicates a reason for the evaluation value, and
the user interface includes:
a first display region that indicates the evaluation value of the target vehicle, and
a second display region that includes a plurality of evaluation reason items, wherein the evaluation reason information corresponds to at least one evaluation reason item of the plurality of evaluation reason items; and
control transmission of each of the event information and the first evaluation information to an information management apparatus.

2. The information processing apparatus according to claim 1, wherein
the CPU is further configured to control the display screen to display an image in the user interface, and
the evaluation value corresponds to one of a positive evaluation value or a negative evaluation value of the target vehicle.

3. The information processing apparatus according to claim 1, wherein the CPU is further configured to:
control reception of driver information of a specific vehicle associated with the information processing apparatus; and
control transmission of the driver information to the information management apparatus.

4. The information processing apparatus according to claim 1, wherein the CPU is further configured to:
detect location information of a specific vehicle associated with the information processing apparatus; and
control transmission of the detected location information to the information management apparatus.

5. The information processing apparatus according to claim 1, wherein the CPU is further configured to:
detect a dangerous vehicle based on an image captured by a camera; and
acquire the event information based on the detection of the dangerous vehicle.

6. The information processing apparatus according to claim 1, wherein the CPU is further configured to:
control reception of second evaluation information from the information management apparatus; and
control output of the received second evaluation information.

7. The information processing apparatus according to claim 6, wherein the CPU is further configured to:
control reception of driving evaluation information of a specific vehicle from the information management apparatus, wherein the specific vehicle is associated with the information processing apparatus; and
control output of the received driving evaluation information.

8. The information processing apparatus according to claim 6, wherein the CPU is further configured to:
control reception of a summary of driving evaluation information of the target vehicle from the information management apparatus; and
control output of the received summary of the driving evaluation information of the target vehicle.

9. An information processing apparatus, comprising:
a Central Processing Unit (CPU) configured to:
control reception of event information associated with a first vehicle;
control reception of evaluation information associated with the first vehicle from a second vehicle, wherein
the evaluation information is received based on the event information associated with the first vehicle,
the evaluation information includes:
an evaluation value of the first vehicle, and
evaluation reason information that indicates a reason for the evaluation value, and
the user interface includes:
a first display region that indicates the evaluation value of the target vehicle, and
a second display region that includes a plurality of evaluation reason items, wherein the evaluation reason information corresponds to at least one evaluation reason item of the plurality of evaluation reason items;
control storage of the evaluation information and the event information; and
execute an analysis process based on the stored evaluation information and the event information.

10. The information processing apparatus according to claim 9, wherein the CPU is further configured to:
acquire at least one of vehicle information, driver information, or location information from the second vehicle;
execute a matching process to match data of event information with at least one of the vehicle information, the driver information, or the location information; and
determine at least one of the first vehicle or a driver of the first vehicle based on the execution of the matching process.

11. The information processing apparatus according to claim 9, wherein
the CPU is further configured to control transmission of a result of the analysis process to the second vehicle, and the transmission is controlled based on the evaluation information and the analysis process.

12. An information processing system, comprising:
a vehicle-side information processing apparatus; and
an information management apparatus, wherein
the vehicle-side information processing apparatus includes a first Central Processing unit (CPU) configured to:
acquire event information associated with a target vehicle,
control, based on the acquired event information, a display screen to display a user interface,
control reception of evaluation information via the user interface, wherein
the evaluation information includes:
an evaluation value of the target vehicle, and
evaluation reason information that indicates a reason for the evaluation values, and
the user interface includes:
a first display region that indicates the evaluation value of the target vehicle, and
a second display region that includes a plurality of evaluation reason items, wherein the evaluation reason information corresponds to at least one evaluation reason item of the plurality of evaluation reason items,
control transmission of the event information and the evaluation information to the information management apparatus, and
the information management apparatus includes a second CPU configured to:
control reception of the event information associated with the target vehicle,
control reception of the evaluation information from the vehicle-side information processing apparatus,
control storage of the event information and the evaluation information, and
execute an analysis process based on the stored evaluation information and the event information.

13. An information processing method, comprising:
acquiring event information associated with a target vehicle;
controlling, based on the acquired event information, a display screen to display a user interface;
controlling reception of evaluation information via the user interface, wherein
the evaluation information includes:
an evaluation value of the target vehicle, and
evaluation reason information that indicates a reason for the evaluation value, and
the user interface includes:
a first display region that indicates the evaluation value of the target vehicle, and
a second display region that includes a plurality of evaluation reason items, wherein the evaluation reason information corresponds to at least one evaluation reason item of the plurality of evaluation reason items;
controlling transmission of the event information and the evaluation information to an information management apparatus.

14. An information processing method, comprising:
controlling reception of event information associated with a first vehicle;
controlling reception of evaluation information associated with the first vehicle-from a second vehicle, wherein
the evaluation information is received based on the event information associated with the first vehicle,
the evaluation information includes:
an evaluation value of the first vehicle,
evaluation reason information that indicates a reason for the evaluation value, and
the user interface includes:
a first display region that indicates the evaluation value of the target vehicle, and
a second display region that includes a plurality of evaluation reason items, wherein the evaluation reason information corresponds to at least one evaluation reason item of the plurality of evaluation reason items;
controlling storage of the event information and the evaluation information; and
executing an analysis process based on the stored evaluation information and the event information.

15. A non-transitory computer-readable-medium having stored thereon computer-executable instructions which, when executed by a processor, cause the processor to execute operations, the operations comprising:
acquiring event information associated with a target vehicle;
controlling, based on the acquired event information, a display screen to display a user interface;
controlling reception of evaluation information via the user interface, wherein
the evaluation information includes:
an evaluation value of the target vehicle, and
evaluation reason information that indicates a reason for the evaluation value, and
the user interface includes:
a first display region that indicates the evaluation value of the target vehicle, and
a second display region that includes a plurality of evaluation reason items, wherein the evaluation reason information corresponds to at least one evaluation reason item of the plurality of evaluation reason items; and
controlling transmission of the event information and the evaluation information to an information management apparatus.

16. A non-transitory computer-readable-medium having stored thereon computer-executable instructions which, when executed by a processor, cause the processor to execute operations, the operations comprising:
controlling reception of event information associated with a first vehicle;
controlling reception of evaluation information associated with the first vehicle from a second vehicle, wherein
the evaluation information is received based on the event information associated with the first vehicle, and
the evaluation information includes:
an evaluation value of the first vehicle, and
evaluation reason information that indicates a reason for the evaluation value,
the user interface includes:
a first display region that indicates the evaluation value of the target vehicle, and
a second display region that includes a plurality of evaluation reason items, wherein the evaluation reason information corresponds to at least one evaluation reason item of the plurality of evaluation reason items;

controlling storage of the event information and the evaluation information; and executing an analysis process based on the stored evaluation information and the event information.

17. The information processing apparatus according to claim 1, wherein the CPU is further configured to:
control the display screen to display an image of a specific vehicle;
determine the specific vehicle is a dangerous vehicle based on second evaluation information of the specific vehicle; and
control, based on the determination of the dangerous vehicle, the display screen to display a warning frame around the dangerous vehicle in the displayed image.

18. An information processing apparatus, comprising:
a Central Processing Unit (CPU) configured to:
acquire event information associated with a target vehicle;
control, based on the acquired event information, a display screen to display a user interface;
control reception of first evaluation information via the user interface, wherein
the first evaluation information includes:
an evaluation value of the target vehicle, and
evaluation reason information that indicates a reason for the evaluation value;
control transmission of each of the event information and the first evaluation information to an information management apparatus;
control the display screen to display an image of a specific vehicle;
determine the specific vehicle is a dangerous vehicle based on second evaluation information of the specific vehicle; and
control, based on the determination of the dangerous vehicle, the display screen to display a warning frame around the dangerous vehicle in the displayed image.

19. An information processing method, comprising:
acquiring event information associated with a target vehicle;
controlling, based on the acquired event information, a display screen to display a user interface;
controlling reception of first evaluation information via the user interface, wherein
the first evaluation information includes:
an evaluation value of the target vehicle, and
evaluation reason information that indicates a reason for the evaluation value;
controlling transmission of each of the event information and the first evaluation information to an information management apparatus;
controlling the display screen to display an image of a specific vehicle;
determining the specific vehicle is a dangerous vehicle based on second evaluation information of the specific vehicle; and
controlling based on the determination of the dangerous vehicle, the display screen to display a warning frame around the dangerous vehicle in the displayed image.

* * * * *